US012786204B1

(12) United States Patent
Riskin

(10) Patent No.: US 12,786,204 B1
(45) Date of Patent: Nov. 3, 2026

(54) ELECTRONIC DOCUMENT EXECUTION SYSTEM

(71) Applicant: UCES Worldwide, Inc., Berkeley Heights, NJ (US)

(72) Inventor: Micah Riskin, Berkeley Heights, NJ (US)

(73) Assignee: UCES Worldwide, Inc., Berkeley Heights, NJ (US)

( * ) Notice: Subject to any disclaimer, the term of this patent is extended or adjusted under 35 U.S.C. 154(b) by 0 days.

(21) Appl. No.: 19/445,948

(22) Filed: Jan. 12, 2026

(51) Int. Cl.
*H04L 9/40* (2022.01)
*G06F 40/106* (2020.01)
*G06F 40/154* (2020.01)

(52) U.S. Cl.
CPC .......... *H04L 63/123* (2013.01); *G06F 40/106* (2020.01); *G06F 40/154* (2020.01)

(58) Field of Classification Search
CPC ..... H04L 63/123; G06F 40/106; G06F 40/154
See application file for complete search history.

(56) References Cited

U.S. PATENT DOCUMENTS

2015/0186344 A1* 7/2015 Leventhal ............. G06F 40/106 715/238
2020/0228561 A1* 7/2020 Petry ................... H04L 63/0428

* cited by examiner

*Primary Examiner* — Esther B. Henderson
(74) *Attorney, Agent, or Firm* — Gearhart Law LLC

(57) ABSTRACT

An electronic document execution system enables users to complete, validate, and manage static electronic documents while preserving immutability of the underlying files. A server receives a static document in a read only format and stores it in a write-protected file store. A client device renders the document within a viewport and allows users to create overlay entry objects at coordinate locations without modifying the document. Each entry object receives user-entered data and is stored in a database as a metadata structure associated with normalized coordinates. One or more modifications generate an immutable event record including a user identity, a timestamp, session data, and/or a state change, which are appended to an event ledger to maintain full traceability. The system supports multi-user execution, dynamic validation rules using smart tags, footnotes, attachments, visual history displays, and workflow transitions from creation through closure and archival, providing a tamper-evident, device-independent execution environment.

20 Claims, 6 Drawing Sheets

400

500

ELECTRONIC DOCUMENT EXECUTION SYSTEM

FIELD OF THE EMBODIMENTS

The field of the invention and its embodiments relate to computer-implemented systems and methods for executing, completing, validating, and managing static electronic documents in a manner that preserves document immutability while facilitating dynamic, coordinate-based data entry. More particularly, the invention pertains to architectures that generate overlay entry objects on top of static documents, record user interactions as immutable event records, maintain full traceability of execution activity, and support multi-user collaboration within a controlled workflow environment.

BACKGROUND

In many industries, execution of process records, batch records, test records, and similar documentation is still performed manually using printed static documents. Users fill in required fields by hand, initial and date each entry, and record attestations or verifications directly on paper. Supervisors and reviewers subsequently examine the completed documents to confirm that all steps were performed correctly. Corrections or revisions are typically written as strikeouts or rewritten entries accompanied by handwritten explanations. These manual procedures require physical handling of documents, and each action must be logged or witnessed on the paper itself.

Manual document execution introduces several technical challenges. Paper-based workflows cannot automatically capture metadata such as precise timestamps, user identity, coordinate location of an entry, or the sequence in which events occurred. Handwritten revisions may obscure prior values, making it difficult to reconstruct a complete change history. Physical documents cannot provide automated validation of field contents, cannot enforce consistent formatting rules, and cannot detect errors such as out-of-range values. Multi-user collaboration can result in inconsistent or duplicated entries, and paper records provide no reliable mechanism to detect overwriting, unauthorized changes, or loss of intermediate states. Paper-based systems also lack a means to ensure alignment between entries and their corresponding locations on the document, and they offer no automated method for organizing, archiving, or retrieving large volumes of executed records.

SUMMARY OF THE EMBODIMENTS

In some aspects, the techniques described herein relate to a computer-implemented method executed by a computing system for device-independent execution of a static electronic document, the method including: receiving, by a server, a static electronic document in a read-only format and storing the static electronic document in a write-protected file store to prevent corruption of document content; rendering, by a client device, a visual representation of the static electronic document within a viewport of the client device; detecting, by the client device, a user selection of a region of the viewport and generating raw viewport coordinates corresponding to the region; mapping, by the client device or the server, the raw viewport coordinates into device-independent normalized coordinates including: normalized origin-point coordinates identifying an anchor location on the static electronic document; and normalized entry-box coordinates identifying an initial placement of an entry box, the mapping based on baseline dimensions defined by a set-sized zoom wrapper that maintains fixed CSS pixel ratios such that browser-level zoom does not affect coordinate relationships within the wrapper; applying one or more coordinate-transform adjustments when a system-controlled zoom operation is active and the user performs creation, resizing, or positional movement of an entry box, wherein the coordinate-transform adjustments convert CSS pixel-based mouse-point coordinates extracted during the creation, resizing, or positional movement into updated normalized entry-box coordinates, while preserving the normalized origin-point coordinates, and wherein visual rendering of the static electronic document and the entry box is performed by the zoom wrapper using a display-level zoom property without requiring coordinate transformation; creating, by the server, an overlay entry object data structure associated with the normalized origin-point coordinates and the normalized entry-box coordinates, the overlay entry object data structure storing metadata describing the entry object but not the rendered object itself, and storing the overlay entry object data structure in a database separate from the static electronic document such that the static electronic document remains immutable; receiving, by the server, user-entered data for the overlay entry object data structure; generating, by the server, an immutable event record including the normalized origin-point coordinates, the normalized entry-box coordinates, one or more dimensions associated with the overlay entry object data structure, the user-entered data, a timestamp, a user identifier, an Internet Protocol address, and a session identifier; storing, by the server, the immutable event record in an append-only event ledger implemented using a tamper-evident structure that prevents modification of prior event records; and displaying, by the client device, an entry box rendered using metadata stored in the overlay entry object data structure, including the normalized origin-point coordinates and the normalized entry-box coordinates, and displaying a visual indicator of the immutable event record within the viewport without modifying the static electronic document.

In some aspects, the techniques described herein relate to a computing system including a server, a client device, a file store, and a database, the computing system configured to: receive a static electronic document in a read-only format and store the static electronic document in the file store as a write-protected document to prevent modification of document content; render, by the client device, a visual representation of the static electronic document within a viewport of the client device; detect, by the client device, a user selection of a region of the viewport and generate raw viewport coordinates corresponding to the region; map, by the client device or the server, the raw viewport coordinates into device-independent normalized coordinates including normalized origin-point coordinates and normalized entry-box coordinates, the mapping based on baseline dimensions defined by a set-sized zoom wrapper that maintains fixed CSS pixel ratios such that browser-level zoom does not affect coordinate relationships within the wrapper; apply, by a transform engine executed by the client device or the server, one or more coordinate-transform adjustments when a system-controlled zoom operation is active and the user performs an initial placement, resizing, or positional movement of an entry box, the coordinate-transform adjustments preserving the normalized origin-point coordinates while updating the normalized entry-box coordinates; create, by the server, an overlay entry object data structure associated with the normalized origin-point coordinates and the normalized entry-box coordinates, the overlay entry object data structure storing metadata describing the entry object but not the rendered object itself, and store the overlay entry object data structure in the database separate from the static electronic document such that the static electronic document remains immutable; receive user-entered data for the overlay entry object data structure; generate an immutable event record including the normalized origin-point coordinates, the normalized entry-box coordinates, one or more dimensions associated with at least one of the overlay entry object data structure, the user-entered data, a timestamp, a user identifier, an Internet Protocol address, or a session identifier; store the immutable event record in an append-only event ledger implemented using a tamper-evident structure that prevents modification of prior event records; and display, by the client device, an entry box rendered using metadata stored in the overlay entry object data structure and a visual indicator of the immutable event record within the viewport without modifying the static electronic document.

BRIEF DESCRIPTION OF THE DRAWINGS

The present disclosure may be better understood, and its numerous features and advantages made apparent to those skilled in the art, by referencing the accompanying drawings. The use of the same reference symbols in different drawings indicates similar or identical items.

DETAILED DESCRIPTION

Figure 1A:
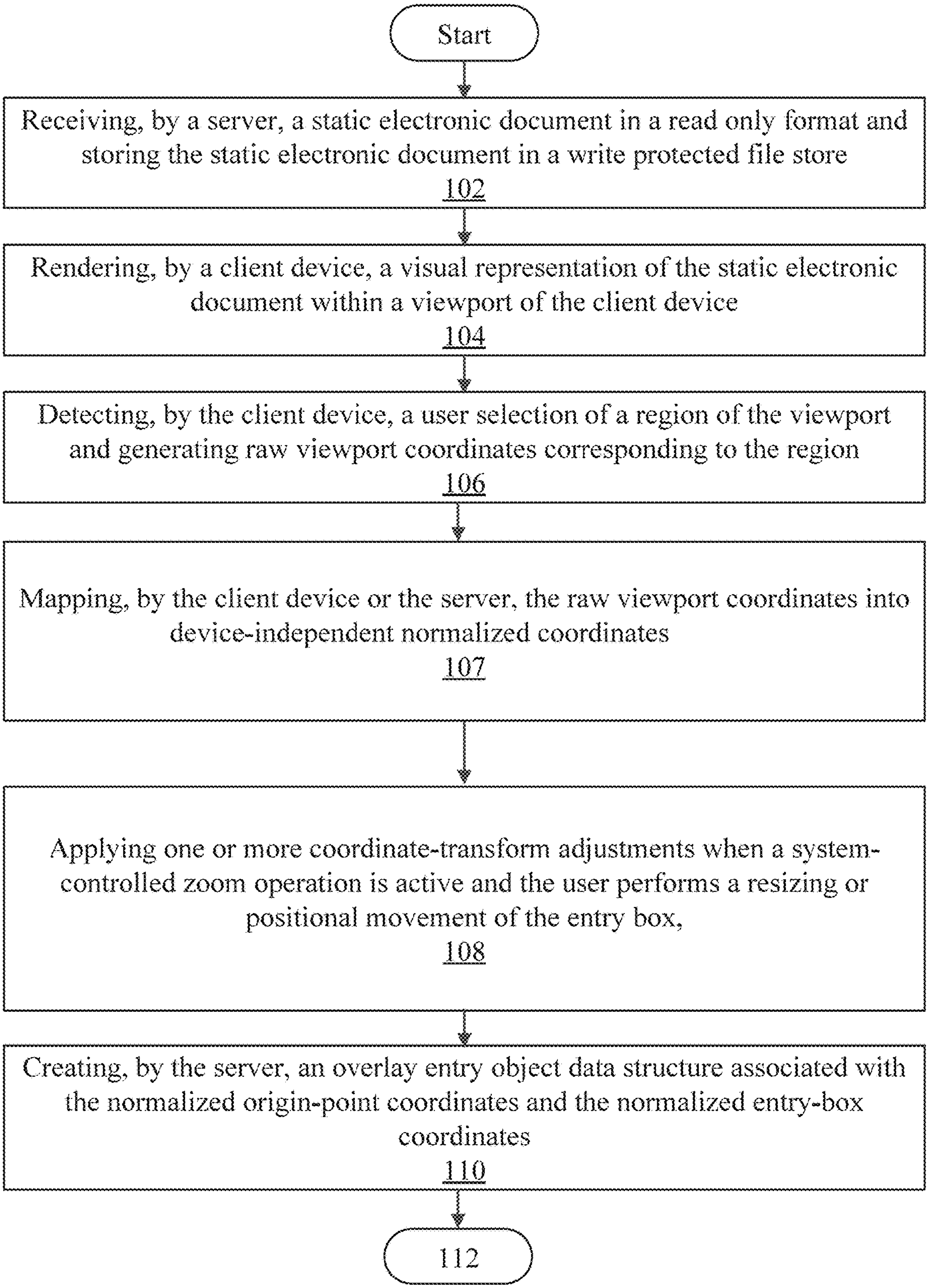
FIG. 1A is a flowchart illustrating a computer-implemented method, according to some embodiments of the present disclosure.

FIGS. 1-5 illustrate computer implemented methods and systems for device independent execution of static electronic documents by generating overlay entry objects and immutable event records without modifying the underlying document file. The techniques allow users to enter data, annotations, or execution related information over a static electronic document while preserving the original file in an immutable format and enabling traceable, tamper evident auditability during each stage of execution.

The system is an electronic document execution platform configured to enable users to complete, review, and manage static electronic documents, including portable document format files, word processing files converted into non-editable representations, and documents generated by cloud-based office platforms, while preserving a permanent and traceable record of user actions and execution events. Document immutability is maintained by storing uploaded documents in a read-only format and preventing direct modification of the underlying file during execution. User interactions with the document are instead captured through structured overlay mechanisms, including overlay entry objects, footnotes, and tags, that exist independently of the static electronic document and are rendered dynamically by the client device based on stored metadata.

These overlay mechanisms differ from conventional document annotations in that they function as structured execution objects rather than simple comments or visual markups. Each overlay entry object is defined by metadata that describes its identity, placement, and functional role within a workflow. In some embodiments, this metadata includes device-independent normalized coordinates identifying both an entry origin point and an associated entry-box region. The entry origin point defines a fixed anchor location on a page of the static electronic document, while the entry-box coordinates define the position and dimensions of a rectangular interaction region that may be repositioned or resized while remaining logically tethered to the origin point. This dual-coordinate model enables specialized execution behaviors, such as placement of point-based indicators including checkmarks or initials at precise locations, while also supporting larger rectangular regions for alphanumeric or numerical data entry.

Additional metadata associated with an overlay entry object may include normalized bounding-box dimensions, entry type designations, tag identifiers, page identifiers, document identifiers, workflow identifiers, revision state indicators, and versioning information. User-entered content itself is treated as execution data and, in some embodiments, is recorded through immutable event records rather than embedded directly within the overlay entry object metadata. Execution events further capture contextual information such as user identifiers, timestamps, network-derived address information, session identifiers, and workflow-state transitions. By storing metadata and execution events in a central server-controlled database and append-only event ledger, the system enables reconstruction of prior execution states with full contextual fidelity while preserving the immutability of the static electronic document.

When a document is uploaded, the system stores the original file in a file store using a write-protected configuration such that the document cannot be modified or replaced without violating integrity checks. One or more subsequent user edits occur through overlay entry boxes that are dynamically generated and positioned based on page identifiers and normalized coordinate mappings. In some embodiments, the overlay entry boxes may be automatically generated by the system using techniques such as optical character recognition, structural detection, or metadata parsing. In other embodiments, the overlay entry boxes may be manually created by the user directly through the browser interface. Manual creation allows the user to define entry regions in circumstances where the underlying document uses atypical or nonstandard formatting, such as entries without printed boxes or lines, or when the user elects to place entries using an alternative approach. This dual-generation model enables the system to support both automated processing and flexible, user-driven definition of entry regions while preserving immutability of the original document.

Each overlay entry box functions as an on-demand generated object that is assigned a unique identifier at the time of creation. The unique identifier serves as the persistent reference by which the system associates the entry box with its corresponding data structure stored in the database.

Although user-entered values and metadata may be stored separately from the entry box itself, the entry box retrieves or references this information whenever it is selected or rendered, allowing the system to reconstruct its state across sessions. The entry box facilitates data entry operations and supports the updating of associated metadata such as field type information, revision state, and coordinate behavior, without requiring that these elements be embedded in the static document. Because overlay entry boxes and their associated data structures exist independently of the underlying file, the system preserves document immutability while enabling consistent recreation and dynamic manipulation of entry regions throughout the execution workflow.

Every action performed by a user, such as creating an overlay entry box, entering data, modifying values, resizing an entry box, adding a footnote, uploading an attachment, or applying an electronic signature, automatically generates a corresponding event record. Event records include both contextual metadata and state-transition metadata. The system stores each event as an immutable record in the database, enabling complete version reconstruction and chronological traceability of one or more modifications, including revisions and deletions. In some embodiments, event records are appended to an event ledger implemented using a monotonic index, hash-linked chain, or other tamper-evident log structure that prevents modification of historical data. Certain event records may correspond to specialized entry types, including page-level signatures that represent a signature applied to a specific page of the static document. These page-level signatures function as entry objects tied to a defined page location and are tracked independently of any workflow-level signatures that may govern transitions between workflow states such as execution, closure, or archival. By recording both categories of signatures as immutable event records within the sealed ledger, the system preserves a complete, tamper-evident history distinguishing page-specific authorization actions from workflow-scope state changes.

The system architecture includes a web-based client that renders the static document and one or more overlay entry boxes within a viewport, a central server that performs authoritative workflow management, a database that stores overlay objects and event records, a file store that maintains original documents and attachments, and an optional Redis caching layer used to support high-throughput multi-user concurrency. The server coordinates one or more read and write operations, resolves concurrent modification attempts, and ensures deterministic state transitions across sessions. Workflows progress through well-defined stages, including creation of the workflow instance, execution of data entries by one or more users, application of verification steps, and optional closure and archival. During execution, multiple users may access the same workflow instance concurrently. The system employs locking mechanisms, queue-based concurrency handling, or cached-state synchronization to ensure proper sequencing of state updates.

The system supports additional features that improve clarity, traceability, and auditing. Footnotes may be linked to individual entries, entire pages, or the full workflow to provide contextual explanations. Attachments may be logged using immutable metadata structures and associated with specific workflow elements. The client device provides a visual display of past and present events, including change histories, revision justifications, sequence identifiers, and user actions. This visualization allows users, supervisors, and reviewers to understand the progression of the workflow and to confirm that entries were completed in accordance with applicable requirements, while the system itself ensures that each entry is recorded in a fully traceable manner. In some embodiments, electronic signatures may be applied at any workflow level, causing automated transitions of workflow state. Further, the system provides a scalable, high-integrity platform for executing static documents with complete immutability, multi-user concurrency support, and a granular, tamper-evident audit trail. The platform addresses limitations of traditional digital form-entry systems by enabling dynamic creation of entry structures on top of unmodified documents, delivering high-fidelity version tracking, and providing a real-time visualization layer that accurately reflects one or more state transitions and execution events.

In some embodiments, an electronic system configured for executing, completing, and managing static electronic documents such as PDF files, word processing documents, and cloud-generated documents while preserving full traceability of user actions and data entries. The system improves the functioning of conventional computing environments by separating immutable document content from dynamic execution metadata, thereby enabling real-time input operations without re-rendering or modifying the underlying file. During operation, the system captures structured metadata for every execution event, including a document identifier, page identifier, coordinate location of the interaction, dimensions and state changes of entry regions, user identity, timestamp values, network-derived IP address information, and session metadata. In embodiments involving data modification or tag modification, the system additionally records a user-entered reason for change, which becomes part of the persistent metadata associated with the affected entry. This ensures that all updates include both the technical context and the user-provided justification, enabling complete reconstruction of the execution history and supporting traceable, reviewable state transitions. These parameters are collected programmatically by the system and processed into an event record that is stored immutably in a central database. By maintaining an append-only sequence of event records, the system ensures complete auditability, chronological reconstruction, and non-repudiation of one or more execution actions, providing a technical improvement over traditional document editing systems that store only the last known state of a document and lack granular historical traceability.

The system architecture includes a web-based client implemented as a browser interface or application that renders static documents in a viewport and displays overlay entry objects that are generated dynamically based on user selections. The web-based client communicates with a central server responsible for workflow management, document state control, and authoritative database transactions. The server maintains the original static document in a write-protected file store and directs one or more modification requests to be processed as metadata overlays, ensuring that no updates are written into the underlying document file. This architecture reduces the computation required for repeated file rendering and avoids corruption caused by direct document modification. In some embodiments, the system incorporates a server-side concurrency management mechanism to support multi-user execution of a workflow. The concurrency mechanism may include a backend service or coordination layer configured to maintain short-lived workflow states, manage simultaneous updates, and ensure consistent ordering of events across distributed client devices. By handling concurrent interactions at the server level, the system reduces lock contention, prevents conflicting writes, and improves throughput and responsiveness during collaborative execution sessions without modifying the underlying static document. Attachments such as supporting files or supplemental documents may also be stored in the file store and linked to workflow events through immutable metadata references.

The central database stores the information associated with each overlay entry box, including the metadata required to recreate the entry box and its full historical record, rather than storing the overlay object itself. In some embodiments, the stored data includes field-type information, coordinate mappings, unique identifiers, revision history, and state transitions, enabling the system to reconstruct the overlay entry box on demand and restore its execution state across sessions. The database also maintains workflow state information and event records as discrete, versioned data structures, thereby preserving a complete lineage of all interactions without modifying the underlying static document. Each entry object is generated on demand by the client when the document is rendered, based on metadata and historical information maintained by the system rather than by storing the entry object itself. The system preserves the data associated with the entry object independently of the static document, including coordinate mappings, type attributes, revision history, and sequence identifiers. When a user interacts with the system, the web-based client transmits the interaction details to the server, which processes the event and writes the resulting metadata to persistent storage in a format that prevents alteration of prior records. Upon subsequent rendering, the server supplies the stored metadata and historical information to the client, enabling the client to recreate the entry object and update its state in real time without modifying, reprocessing, or regenerating the underlying static document. Through this architecture, the disclosed system improves computer functionality by enabling efficient, high-fidelity document execution operations that preserve immutability, maintain deterministic rendering across heterogeneous devices, and support multi-user interactions through concurrency-optimized data structures.

In operation, the system performs a structured workflow sequence that enables controlled execution of static electronic documents while preserving immutability, traceability, and deterministic state management. When a user initiates the workflow, the system first performs a login operation during which the server validates user credentials, verifies session integrity, and applies permission controls that determine which workflow actions the user is authorized to perform. This access-control step improves system security by preventing unauthorized modifications and ensures that subsequent workflow events can be reliably attributed to the correct authenticated user identity.

Once authenticated, the system enables creation of a workflow instance, sometimes referred to as a binder. During binder creation, the server allocates persistent storage structures for the workflow, initializes workflow metadata, and generates a unique workflow identifier as well as unique identifiers for any initial execution documents associated with that workflow. Additional identifiers for entry objects, attachments, and event records are generated as needed during subsequent operations, and may be created sequentially or according to another deterministic scheme. Each of these identifiers is linked to the workflow identifier, enabling all related objects and events to be reliably associated with the correct workflow instance and allowing the system to reconstruct workflow state and document execution history across sessions. This initialization step provides a technical benefit by establishing a deterministic environment for the execution of static documents, allowing the server to coordinate multi-user interactions and maintain isolation between concurrently active workflows.

Upon creation of the workflow instance, the system enables the user to upload one or more static electronic documents, which may be added either simultaneously or concurrently as part of the workflow initialization process. The server receives these documents, converts them into a read only storage format, and places them into a write-protected file store using integrity-preserving mechanisms such as checksums or hash validation. In some embodiments, the file store additionally enforces access-restriction controls that prevent unauthorized overwrite, replacement, or deletion operations, thereby ensuring that the stored document remains immutable throughout the execution workflow. The server then associates each document with its workflow identifier. By storing the documents immutably and preventing direct modification, the system addresses deficiencies in conventional editing platforms where user actions can corrupt or overwrite source files. This approach ensures that one or more execution operations occur through metadata-based overlays rather than modifications to the underlying file.

During the document execution phase, the system renders the static electronic document on a client device and allows users to create, edit, and/or interact with overlay entry objects positioned according to normalized coordinates. The server manages one or more state transitions, resolves concurrency conflicts, and generates immutable event records for each interaction. Users may execute the workflow individually or concurrently with other participants, and the system's multi-user coordination mechanisms ensure deterministic ordering of events even under simultaneous updates. This controlled execution phase improves computational efficiency by separating rendering operations from data processing, reducing the need for repeated document re-renders, and leveraging optimized data structures for managing overlay metadata.

Upon completion of one or more required entries, verifications, and optional signature operations, the workflow transitions into a closure phase. During closure, the server validates that one or more required data fields have been executed and that no pending actions remain. The system applies finalization logic to lock the workflow, preventing further modifications unless explicitly reopened under controlled conditions. This automated closure mechanism enhances data integrity and eliminates errors associated with manual inspection or incomplete execution.

Once closed, the workflow instance is archived. Archival involves designating the workflow metadata, immutable event records, overlay entry objects, footnotes, attachments, and workflow identifiers as belonging to a long-term retention state. In some embodiments, this designation does not require physically relocating the data; instead, the archived information is written or re-indexed into a user-accessible, read-append-only archival database, or alternatively stored within a dedicated archival schema of the existing database to maintain strict logical separation from active workflow data. This configuration preserves immutability while enabling controlled administrative access to historical execution records. The archival process preserves workflow history in a format optimized for later retrieval, auditing, or regulatory review. Archived workflows remain immutable, and the system retains full version history, allowing historical reconstruction of the workflow at any prior point in time.

Collectively, the workflow sequence provides a computer-implemented process that improves upon traditional document execution systems by maintaining immutable source documents, generating deterministic metadata overlays, supporting multi-user concurrent interaction through server-side coordination, and storing one or more state transitions in a tamper-evident format. These technical enhancements materially improve the functioning of the computing system itself and support reliable document execution across diverse devices and network conditions.

In the execution environment, when a user accesses a workflow instance, the client device renders the previously uploaded static electronic document within a controlled viewport of the client interface. The document is displayed directly from its read only representation, and the rendering engine does not permit modification of the underlying file. Instead, the system enables users to create entry boxes, which are rectangular data fields anchored to defined coordinate positions on the displayed page. These entry boxes may be created manually by user selection of a region on the viewport or through automation-assisted generation techniques such as optical character recognition, text extraction analysis, or raster-based detection of input regions. These automated detection processes allow the system to identify structurally meaningful zones within the document, providing a technical improvement over conventional systems that rely on predefined static form templates.

Each entry box is assigned a unique identifier generated either from the coordinate position of the box or from a system-generated identifier issued by the server. The assignment of unique identifiers enables the server to bind each user interaction to a stable metadata structure that persists independently of the underlying static document. When the user enters data into an entry box, the client device does not transmit the data immediately upon keystroke; instead, transmission occurs upon submission of the entry. The system prevents the user from navigating away from the entry box or initiating a new entry until the user either removes the text or submits the data, thereby ensuring that no unsaved or partially entered information can persist locally on the client device. Upon submission, the client device transmits the entry value, the associated entry-box identifier, and relevant context metadata to the server for persistent storage and further processing. The server stores this data in the database as an overlay structure that references the coordinate position of the static document without altering the document itself. This division between immutable document content and dynamically updated metadata provides a technical solution to the computational inefficiencies associated with modifying static files, reducing rendering overhead, and eliminating file corruption risks.

One or more modifications made to an entry box, including resizing, text changes, data entry, and updates to field attributes, are recorded by the system as discrete event records. In some embodiments, the entry box itself may be repositioned within the document viewport; however, the entry-origin point associated with that entry box remains fixed and cannot be altered once established. The system visually represents this relationship by maintaining a displayed connection between the entry box and its corresponding origin point, enabling reviewers to understand both the spatial context of the data entry and any subsequent repositioning actions performed by users. Each event record includes a timestamp, user identifier, session metadata, and/or a version index generated by the server. The system stores these event records in an append-only event ledger, allowing the server to maintain a complete chronological history of changes associated with each entry box. The use of version-indexed, immutable event storage enables the system to reconstruct any prior state of the workflow deterministically and provides a technical advantage over prior systems that track only the latest modification to a file.

The execution environment also includes real-time visual feedback mechanisms. When a significant attribute of an entry box changes, such as its assigned tag, textual content, or coordinate position prior to data commitment, the client interface visually flags the alteration. These visual cues include color transitions, shading, numerical labels, or indicator icons that help users interpret the current execution state without causing the underlying document to be re-rendered. This client-side visualization technique increases processing efficiency by eliminating unnecessary redraw operations and reducing latency in multi-user scenarios.

Entry boxes remain modifiable only until the first committed data value is stored. Prior to that point, both the entry box and the associated entry-origin point may be adjusted. Once an initial value is committed, however, the system transitions the entry-origin point into a locked state such that the origin point becomes immutable for the remainder of the workflow instance. Although the entry box itself may still be repositioned after the origin point is locked, the system maintains a persistent tether between the box and its origin point. In some embodiments, this tether is represented as a visual line displayed between the origin point and the entry box, enabling reviewers to determine where the entry was originally anchored. While the lower-left corner of an entry box often coincides with the entry origin point, the system supports alternative configurations in which the origin point and the rendered entry box location do not coincide. For example, in checkmark-style or point-based visual entries, the origin point represents the precise on-page location to which the execution action logically applies, while the rendered entry box may be offset to improve visibility or usability. In another example, a user may reposition an entry box relative to its origin point to accommodate a larger amount of data entry space, such as when extended alphanumeric text, multi-line notes, or procedural confirmations are required. In such cases, the entry box may be moved downward or laterally to provide sufficient room for the entry, while remaining logically tethered to the original origin point. The origin point continues to represent the authoritative reference location on the static electronic document, even though the visual placement of the entry box has shifted. This tethered relationship allows the system to preserve the semantic intent of the entry location while enabling flexible layout adjustments, particularly in scenarios where the logical point of execution and the lower-left corner of the rendered entry box do not coincide. This ensures consistent spatial traceability even when the entry's visual rendering varies.

This anchored behavior is used to represent the logical initiation point of an entry rather than a display-dependent reference. The entry origin point corresponds to the location on the static electronic document where a user would logically begin an entry, analogous to placing a pen on a physical page to start writing. When additional space is required for the entry, such as when a user adds multiple lines of text or extended notes, the rendered entry box may expand or be positioned below the origin point to accommodate the additional content. In such configurations, the logical origin point may be located above the lower-left corner of the rendered entry box. The system preserves the origin point as the authoritative reference location on the document page, while allowing the entry box to grow or shift as needed, thereby maintaining the semantic intent of the entry location independently of the amount of space ultimately required for data entry.

The coordinate-locking mechanism is used to preserve the semantic and logical placement of execution entries after an initial value has been committed. Once an entry is established, the system prevents further modification of the entry origin point to ensure that the logical initiation location of the entry remains consistent throughout subsequent execution, review, and archival stages. Visual alignment across devices and display environments is handled separately by the zoom wrapper and rendering logic, while coordinate locking ensures that the authoritative reference location associated with the entry cannot be inadvertently altered after commitment, thereby maintaining execution intent and audit integrity.

Once one or more required entries and verification steps are completed, the workflow may transition to a closed state. In the closed state, no additional modifications are allowed unless the workflow is formally reopened. When reopening occurs, the system initiates a controlled re-execution process that increments the workflow's revision number and records a corresponding revision event in the workflow's metadata. The reopened workflow remains linked to the original static document and its historical execution records, but any subsequent actions are captured as part of the new revision, thereby preserving a clear and immutable separation between the original execution state and the revised execution state. This two-tier execution architecture ensures that finalized workflows remain immutable while still allowing re-execution scenarios that preserve a complete lineage of workflow states. The execution environment additionally supports electronic signature operations applied at the workflow, document, page and/or entry box level. When a signature is applied, the system records a corresponding event record and may optionally lock the associated portion of the workflow, such as an individual page, a specific document within a workflow binder, or the entire workflow itself. The scope of the lock corresponds to the level at which the signature was executed, ensuring that the signed content remains immutable while still allowing unsigned portions of the workflow to continue through their execution states.

These signature events are stored in the same append-only event ledger as other state transitions, ensuring complete traceability of user actions and preserving the integrity of the execution history. In some embodiments, application of an electronic signature may require authentication using one or more mechanisms commonly employed for electronic signature execution, including verification of a username and password, entry of an abbreviated or secondary password, multi-factor authentication, biometric authentication such as fingerprint, facial recognition, or voice recognition, or combinations thereof. The authentication mechanism used for a given signature event may be recorded as part of the immutable event record or referenced by an associated authentication identifier. By capturing signature events and their associated authentication context within the same tamper-evident ledger used for data entry, modification, and deletion events, the system provides a unified, auditable record of execution activity that supports verification, non-repudiation, and compliance review without altering the underlying static electronic document.

The system also provides a set of additional capabilities that improve the reliability, traceability, and computational efficiency of electronic document execution workflows. In some embodiments, the system supports footnotes that operate as structured metadata elements linked to specific overlay entry objects, entire pages, individual documents, or complete workflow instances. These footnotes may be associated with an ordinal position or page index and are stored as immutable metadata records in the central database, enabling the system to preserve contextual commentary without altering the underlying static document. The ability to attach metadata at multiple hierarchical levels provides a technical improvement over conventional annotation systems that embed comments directly into files, as the present system separates semantic information from file content to maintain immutability while still offering fine-grained contextual detail.

The system further supports deletion operations in which an overlay entry object may be hidden or visually removed from the client interface while preserving its underlying historical data. When a user performs a deletion, the client device transmits a deletion request to the server, which generates a corresponding deletion event record. The event record includes session information, the identity of the user initiating the deletion, the coordinates of the entry object, and the timestamp of the operation. The addition of a deletion event to the append-only event ledger alerts users that a deletion occurred and ensures that no data is silently removed. When an overlay entry object is hidden or visually removed, the deletion event records identifying information associated with the entry object, including its unique identifier and the normalized origin-point coordinates corresponding to the original anchor location on the static electronic document. Based on this information, the system is able to identify the original location of the deleted entry and, in some embodiments, render a visual marker, indicator, or notation at or near the origin-point coordinates to convey that an entry previously existed at that location. The visual marker may include a symbol, textual notation, or other graphical cue indicating a deletion or removal event, thereby providing transparency to reviewers and preserving contextual awareness of prior execution activity while maintaining the immutability of the underlying static electronic document. This event-driven deletion mechanism represents a technical enhancement over systems that physically remove objects and lose lineage information, as the disclosed approach maintains full execution history while optimizing interface clarity.

In some embodiments, the computing system implements an electronic document execution architecture in which a static electronic document is received by a server in a read-only format and stored in a write-protected file store. The static electronic document may include a portable document format file, a word processing file converted into a non-editable representation, or an image-based rendering of a document. The write-protected configuration prevents modification of the underlying document content during execution while allowing user interactions to be captured through overlay mechanisms that exist independently of the document file.

When the static electronic document is rendered on a client device, the system presents the document within a viewport that includes a zoom wrapper having fixed CSS width and height dimensions explicitly defined by the application. These dimensions remain constant regardless of device resolution, pixel density, or browser-level zoom, thereby establishing a stable, device-independent layout coordinate space. Normalized coordinates used by the system are derived from native dimensions of the static electronic document, such as the physical page size, mapped into the fixed CSS coordinate system maintained by the zoom wrapper. Visual scaling of the document is performed using a system-controlled zoom mechanism that applies a display-level transform to the zoom wrapper. This transform affects only the rendered appearance of the content and does not alter the underlying layout metrics or normalized coordinate space.

During user interactions, such as creation of an entry box, resizing of an entry box, or repositioning of an entry box, the client device captures mouse-point coordinates that reflect the visually scaled state of the zoom wrapper. Because CSS transforms do not modify layout-based measurements or event coordinate reporting, the system applies coordinate-transform adjustments to convert the extracted mouse-point coordinates into the normalized layout coordinate space. These transformations preserve normalized origin-point coordinates that define an anchor location on the static electronic document, while recalculating normalized entry-box coordinates to reflect updated dimensions or positions of the entry box. In this manner, the entry box remains logically tethered to its origin point even when visually repositioned or resized.

Upon creation of an entry box, the server generates, or validates if generated by the client device, a unique identifier for an overlay entry object data structure using a sequential numeric or alphanumeric convention. The overlay entry object data structure stores metadata describing the entry object, including normalized origin-point coordinates, normalized entry-box coordinates, normalized bounding-box dimensions, entry type designations, and tag identifiers, but does not store the rendered object itself. The unique identifier is stored in association with a document identifier, a page identifier, and a workflow identifier corresponding to a workflow or binder instance in which the entry object is created. This multi-level association enables precise reconstruction of entry objects across multi-page documents, across workflow revisions, and across execution sessions.

User-entered data associated with an overlay entry object is treated as execution data rather than metadata. In some embodiments, execution data is captured exclusively through immutable event records generated by the server when a value is submitted or modified. In other embodiments, a current-value field may be maintained within the overlay entry object data structure for rendering purposes, while prior values and change history are preserved in the event ledger. Each immutable event record may include references to the overlay entry object identifier, normalized coordinates or identifiers, dimensional attributes, the entered value, a timestamp, a user identifier, an Internet Protocol address, a session identifier, and, when applicable, a user-entered reason-for-change.

All event records, including creation events, data-entry events, modification events, deletion events, and signature events, are appended to an append-only event ledger implemented using a tamper-evident structure. In some embodiments, the event ledger employs a monotonic sequence number, a cryptographic hash chain, or both, such that modification of any prior event record can be detected. The backend database storing the event ledger is access-restricted and not directly accessible to end users, and the server functions as the authoritative source for validating and persisting execution state.

When an overlay entry object is hidden or visually removed, the server generates a deletion event that records the identifier of the entry object and the normalized origin-point coordinates corresponding to its original location. Based on this information, the system may render a visual marker or notation at or near the original location to indicate that an entry previously existed and was removed. In some embodiments, display of deletion markers is configurable, allowing users or reviewers to toggle visibility during execution or audit review while preserving the underlying deletion records in the event ledger.

The system further supports application of electronic signatures at a page level, document level, or workflow level. Signature events may require authentication using mechanisms commonly employed for electronic signature execution, including username and password verification, secondary or abbreviated passwords, multi-factor authentication, biometric authentication, or combinations thereof. Signature events are recorded in the same append-only event ledger as other execution events, ensuring that signature actions are traceable and auditable as part of the overall execution history. By separating static document content from overlay entry metadata and immutable execution events, the system provides a technical improvement over conventional document execution approaches. The architecture enables precise placement and reconstruction of entry objects, preserves document immutability, supports system-controlled zoom and interaction-specific coordinate transformations, and maintains a complete, tamper-evident execution history associated with document, page, and workflow contexts.

In some embodiments, the system provides one or more review controls that allow users, supervisors, or auditors to selectively display or suppress visual markers associated with deletion events. For example, the client device may present a toggle or filter option that enables viewing of all deletion markers, viewing of deletion markers associated with a selected page or entry category, or hiding of deletion markers during routine execution while retaining visibility during review or audit modes. The underlying deletion event records remain preserved in the append-only event ledger regardless of the selected display state. When enabled, the visual marker and associated notation may be rendered adjacent to the normalized origin-point coordinates of the deleted entry, and may further provide access to contextual information such as the identifier of the deleted entry, the user who performed the deletion, the time of deletion, and any recorded reason-for-deletion. This configurable visualization allows the system to balance execution usability with transparency and traceability, while ensuring that deletion history remains available for reconstruction and compliance verification without modifying the static electronic document.

In some embodiments, the system includes visualization features that allow the client device to render one or more entry boxes, coordinate mappings, and event histories in a structured, human-readable format. The visualization layer retrieves metadata structures from the server and overlays graphical representations onto the document viewport. This approach eliminates the need to modify the static electronic document, reduces rendering load, and provides users with immediate insight into historical and current execution states. Because the system decouples visualization from file manipulation, it eliminates issues associated with re-embedding graphical elements or re-saving documents, thereby improving graphical stability across heterogeneous device types and display resolutions.

Attachments may also be incorporated into the workflow. When a user uploads an attachment, the server stores the file in the write-protected file store and generates an immutable event record marking the addition of the attachment as a major workflow action. Each attachment is associated with a workflow identifier and document sequence to ensure that one or more supplementary materials remain traceable throughout the execution lifecycle. This architecture offers technical advantages over prior systems by treating attachments as first-class workflow entities rather than untracked, user-managed artifacts.

The system additionally provides a smart tag and criteria functionality designed to apply dynamic validation rules to individual entry boxes or groups of related entries. A smart tag comprises a structured rule set that may include acceptable numerical ranges, expected data types, formatting patterns, or validation masks. Users may configure smart tags manually during authorized workflow phases, or the server may automatically generate them based on metadata discovered within the uploaded static electronic document. When the input document includes embedded criteria, the server uses one or more PDF parsing libraries or text-extraction modules to detect and interpret this metadata, thereby prepopulating rule definitions associated with candidate entry objects. The system may present these suggested rules to the user, who then applies the corresponding smart tag to the selected entry object. In some embodiments, automated assistance identifies likely tag-entry associations, but the final assignment of a tag to an entry object remains a user-driven action, ensuring deliberate and traceable configuration of validation rules for each entry. During data entry, the client interface displays the expected values or constraints to the user through tooltips, inline guidance, and/or one or more contextual indicators. When the user enters a value, the system evaluates the input against the assigned validation rules either on the client device or on the server, depending on the computing environment and available resources. If the value does not satisfy the rule, the system generates a violation flag and displays a visual indicator at the corresponding entry box location. In some embodiments, tag assignment may be automated through document-level analysis that detects graphical or semantic indicators of field type, thus enabling the system to enforce consistent validation logic and support review-by-exception workflows. This criteria-driven validation architecture provides a technical improvement over conventional systems by enabling machine-executable rule enforcement, reducing manual verification burdens, and/or improving data accuracy in multi-user execution environments.

Figure 1B:
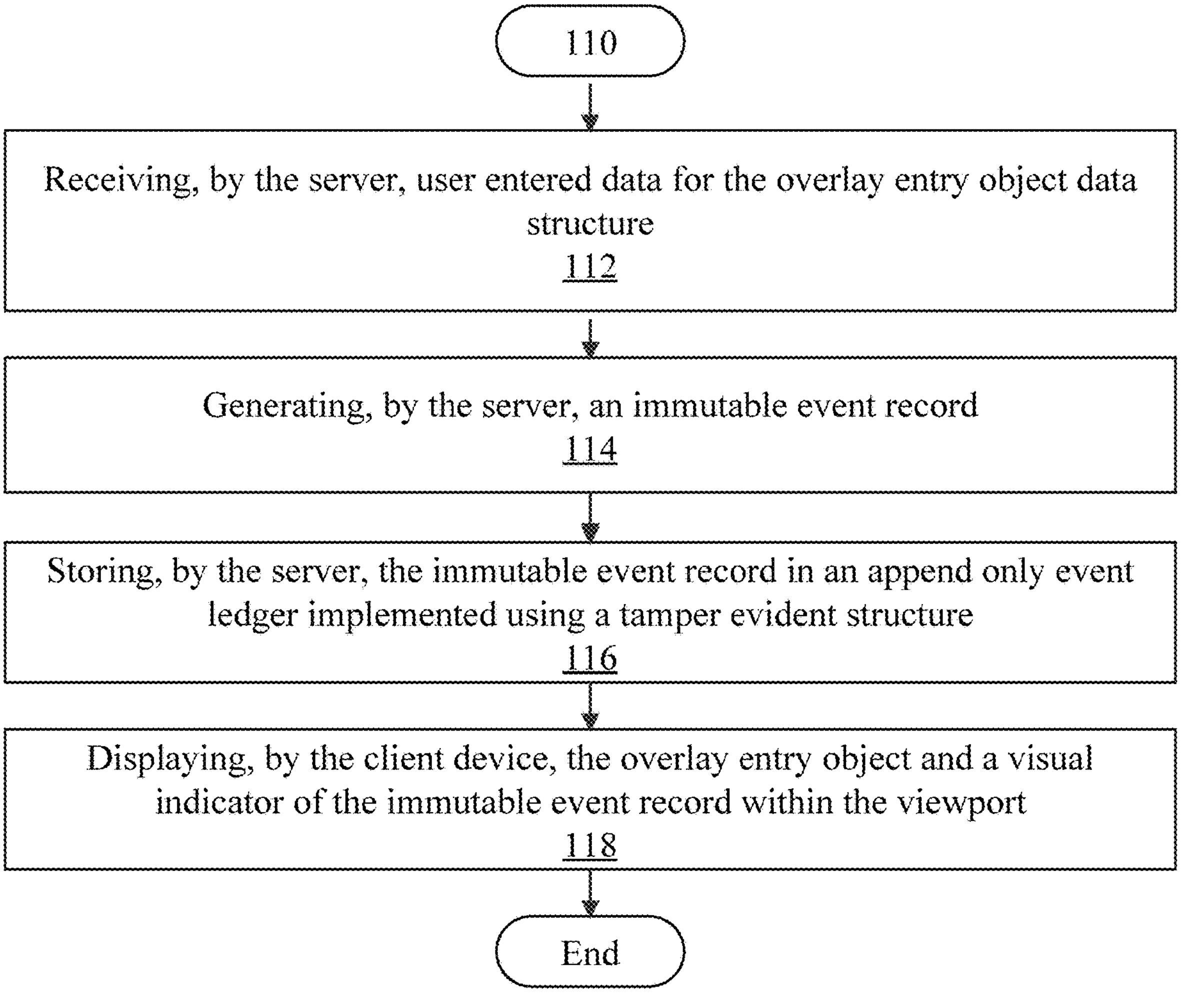
FIG. 1B is a flowchart extending from FIG. 1A and further illustrating the computer-implemented method, according to some embodiments of the present disclosure.

FIGS. 1A and 1B illustrate an example method executed by a computing system including a server and one or more client devices. At block 102, the server receives a static electronic document in a read only format. The static electronic document may include a PDF file, a word processing file that is internally converted into a non-editable document representation, or an image-based rendition of a document. In some embodiments, both the original file and the converted non-editable representation are stored, with the original maintained in an access-restricted state to prevent unauthorized modification, replacement, or deletion. The converted representation is used for execution operations to ensure consistent rendering and immutability throughout the workflow. Upon receipt, the server stores the static electronic document in a write protected file store. In some embodiments, the write protection applies to a designated protected subset of a larger storage system, wherein the subset is configured to prevent overwrite, modification, or deletion of stored documents. This protected subset ensures that once a document is placed into the execution workflow, its underlying content remains immutable for the duration of the workflow and for any subsequent archival or review procedures. The write protected file store prevents corruption of the document content and ensures that one or more subsequent editing or execution activity occurs through external metadata rather than modification of the static file itself.

At block 104, a client device renders a visual representation of the static electronic document within a viewport of the client device. The viewport may correspond to an output region or container within a browser, application window, or dedicated rendering frame. The server transmits the static electronic document in its stored form, and the client device renders the document using a rasterization or display engine suitable for the document format. Because the document is read only, the user cannot directly alter the document pixels or text.

At block 106, the client device detects a user selection of a region of the viewport. The selection may occur through cursor positioning, touch input, pen input, pointer selection, or other user interface mechanisms. The client device generates raw viewport coordinates corresponding to the selected region. The raw viewport coordinates may include pixel based dimensions, offsets, and bounding box coordinates defined by the active viewport configuration at the time of selection, or may alternatively be expressed using percentage-based units such as vh (viewport height).

At block 107, the system maps the raw viewport coordinates generated by the client device into device-independent normalized coordinates. This mapping is essential for ensuring that user interactions with the static electronic document remain consistent across different devices, screen sizes, resolutions, and orientations. The raw viewport coordinates originate from direct user interactions within the viewport, but because these coordinates are dependent on the specific characteristics of the client device, the system converts them into normalized values that remain stable regardless of hardware or browser environment. The normalized coordinates include normalized origin-point coordinates, which identify a fixed anchor location on the static electronic document, and normalized entry-box coordinates, which define the initial placement of an entry box relative to that anchor point. To achieve this normalization, the system relies on baseline dimensions established by a set-sized zoom wrapper that surrounds the displayed document. The zoom wrapper maintains fixed CSS pixel ratios, allowing the coordinate relationships within the wrapper to remain unaffected by browser-level zoom or changes to the viewport. As a result, the system ensures that entry boxes and reference points appear in the same position on the document regardless of how the client device scales, rotates, or otherwise presents the document. This mapping process allows the system to deliver device-agnostic placement of interactive elements, ensuring that the execution of the document is uniform and predictable across sessions and across different client devices.

At block 108, the system applies one or more coordinate-transform adjustments when a system-controlled zoom operation is active and the user performs creation, resizing, or positional movement of an entry box, such that interaction coordinates obtained from the visually scaled display are converted into normalized coordinates while preserving the normalized origin-point coordinates. These adjustments are necessary because, unlike browser-level zoom, which does not affect the coordinate relationships within the set-sized zoom wrapper, a system-controlled zoom operation changes the scale at which the document is rendered inside the wrapper. When such a zoom occurs, the visual scale of the document changes, but the underlying normalized coordinate space must remain consistent to ensure accurate placement and tracking of interactive elements.

When a system-controlled zoom operation is active, the zoom wrapper visually scales the static electronic document and any associated overlay entry objects using a display-level zoom property. This visual scaling affects the apparent size of the rendered content but does not modify the underlying CSS layout dimensions or the normalized coordinate system maintained by the zoom wrapper. As a result, visual rendering of the static electronic document and the entry box remains correctly aligned without requiring coordinate transformation. However, during user interactions that involve resizing, initial placement, or positional movement of an entry box, mouse-point coordinates extracted from interaction events are reported in CSS pixel units corresponding to the visually scaled coordinate space. In response to such interactions, the system applies one or more coordinate-transform adjustments that convert the extracted CSS pixel-based mouse-point coordinates into updated normalized entry-box coordinates within the fixed layout coordinate system. These coordinate-transform adjustments preserve the normalized origin-point coordinates that define the anchor location of the entry object on the static electronic document, while recalculating the normalized entry-box coordinates to reflect the new position or dimensions of the entry box, thereby maintaining correct logical placement and tethering of the entry object within the workflow.

A similar transformation process occurs when the user resizes or moves an entry box while a system-controlled zoom operation is active. During such interactions, the client device captures mouse-point coordinates that reflect the visually scaled state of the zoom wrapper rather than the underlying layout coordinate space. Because the zoom wrapper applies visual scaling through a display-level transform without modifying its fixed CSS width and height, the captured mouse-point coordinates must be converted back into the normalized coordinate system maintained by the wrapper. In response, the system applies a coordinate-transform adjustment that inverse-maps the extracted mouse-point coordinates into normalized layout coordinates. This transformation updates the normalized entry-box coordinates to reflect the new dimensions or position of the entry box resulting from the resize or movement operation, while preserving the normalized origin-point coordinates that define the fixed anchor location of the entry object on the static electronic document. In this manner, the system ensures that repositioning or resizing operations affect only the logical placement of the entry box relative to its origin point, without introducing positional drift or altering the anchor location within the document. This approach ensures that each entry box maintains a stable logical relationship to the static electronic document while still enabling interactive manipulation of box size, placement, or orientation within the zoom-adjusted canvas environment.

At block 110, the server generates a unique identifier and creates an overlay entry object data structure associated with the normalized coordinates. In some embodiments, the normalized coordinates identify a location within a specific page of the static electronic document and are interpreted in conjunction with a page identifier. In other embodiments, the normalized coordinates are further contextualized by association with a document identifier and a workflow identifier corresponding to the workflow instance under execution. The overlay entry object data structure therefore may be logically scoped by a combination of coordinate values, page context, document context, and workflow context, enabling precise identification of the entry location across multi-page documents and across multiple workflow instances that reference the same underlying document.

The overlay entry object data structure defines persistent attributes of the entry object, including coordinate references, dimensional attributes, entry type, revision state, and linkage identifiers, while the rendered visual representation of the entry object is instantiated dynamically by the client device based on the stored metadata. By separating coordinate values from higher-level contextual identifiers, the system supports flexible reconstruction and replay of entry objects across sessions, devices, and workflow revisions, while maintaining unambiguous association between each entry object, its location within a document, and the workflow in which it was created.

The rendered entry object that the user interacts with is instantiated on the client device, based on the metadata contained within the server-created data structure. The server stores the overlay entry object data structure in the database, while the client device generates a corresponding interactive entry box using the identifier and coordinate information received from the server. This separation allows the server to maintain authoritative, persistent metadata for each entry object while enabling the client device to dynamically construct and render the interactive interface elements without modifying the underlying static electronic document. The overlay entry object data structure may include metadata describing both the normalized origin-point coordinates and the normalized entry-box coordinates, the origin point defining a persistent anchor location on the static electronic document and the entry-box coordinates defining the current placement of the rendered entry box. In typical cases, the origin point corresponds to the lower-left corner of the entry box at creation, but the entry box may later be repositioned by the user while remaining logically tethered to the origin point. The metadata maintained in the overlay entry object data structure therefore preserves the origin point, updates the entry-box coordinates as the box is moved or resized, and supports visual representations, such as a connecting line or other indicator, that convey the continued association between the entry box and its anchor location. The data structure may further include metadata describing the dimensions, type, initial state, and other attributes relevant to the execution of the entry object. The static electronic document remains immutable because one or more data entry and subsequent modifications occur within the overlay entry object rather than within the underlying file.

As noted above, an overlay entry object associated with the normalized coordinates may be created either by the client device or by the server, depending on system configuration. In some embodiments, the client device initially generates the overlay entry object in response to user interaction and transmits the associated metadata to the server for validation and persistence. In other embodiments, the server generates the overlay entry object upon receiving the normalized coordinates and returns the corresponding metadata to the client device for rendering. This flexible creation model allows the system to support front-end instantiation for responsive user interaction while maintaining authoritative, server-validated data structures that preserve immutability and traceability of the execution process. In one embodiment, the overlay entry object is instantiated as a structured data record that includes a unique identifier, a coordinate field specifying both the normalized origin-point coordinates and the normalized bounding-box coordinates of the entry box, a bounding-box dimension field identifying the height and width of the entry box, a type field defining the kind of entry object to be rendered, and an initialization-state field indicating the initial state of the entry object before any user-entered values are committed.

Unlike conventional form-based systems that predefine fixed fields, the overlay entry object is dynamically generated at runtime in response to user interaction on the client device. This dynamic generation provides a technical improvement because the system does not require pre-rendering thousands of potential input fields within the static electronic document. Instead, the client device renders the document using one or more libraries such as pdf.js, which can display any PDF at arbitrary resolutions or sizes without modifying the underlying file. By avoiding embedded form fields inside the PDF itself, which are memory-intensive to create, maintain, and manipulate, the system reduces processing overhead and prevents latency that would otherwise occur when handling large or complex documents. The approach allows interactive entry boxes to be generated on demand as lightweight overlay elements rather than as fully embedded PDF structures, resulting in faster rendering performance, reduced memory consumption, and a more responsive user experience even when operating on resource-constrained devices or executing documents containing numerous user input regions.

The overlay entry object data structure is stored in a database physically separate from the static electronic document. This architectural separation provides a concrete technical benefit by isolating mutable metadata from the immutable document content, eliminating the need to modify or rewrite large binary document files whenever a user enters new information. For example, when an operator enters a value or annotation, the system stores only a few kilobytes of metadata or less in the overlay entry object rather than rewriting an entire PDF, which can often exceed multiple megabytes. This dramatically reduces disk I/O operations, eliminates file-locking conflicts, and allows multiple users to interact with the same document concurrently without corrupting the underlying file.

In another embodiment, the overlay entry object data structure includes metadata fields describing (i) the device-independent normalized coordinates of both an origin point and an associated entry box, which are the coordinate values persisted by the system, (ii) normalized bounding-box dimensions of the entry box expressed in the same device-independent coordinate space rather than in device-dependent pixel-space render dimensions, which are not stored because such values vary across devices and display environments, (iii) an entry type designation identifying the functional role of the entry, such as a numeric field, an alphanumeric text field, a check box, a page-level signature region, a freeform signature capture region, or an attestation field, and (iv) a tag identifier applied to the entry object, wherein validation requirements, constraints, or business logic associated with the tag are defined and managed separately by the system and are not embedded within the entry object metadata itself.

In some embodiments, the user-entered data or value associated with the entry object is not considered metadata of the overlay entry object data structure, but is instead recorded as part of one or more immutable event records generated during execution. In other embodiments, a current-value field may be maintained within the overlay entry object data structure to reflect the most recent committed state for rendering purposes, while prior values, revisions, and change reasons are preserved exclusively within the immutable event ledger. This separation allows the system to treat user-entered content as operational state data, while maintaining metadata as structural descriptors that enable reconstruction, validation, and rendering of the entry object without embedding mutable content directly into the static electronic document or its associated layout definitions.

As used herein, the term "metadata" refers to structural, positional, and classificatory information that defines how an overlay entry object is identified, positioned, rendered, and governed within the system, independent of any specific user-entered content. Metadata includes, by way of example, device-independent normalized coordinates, bounding-box dimensions, entry type designations, tag identifiers, page identifiers, document identifiers, workflow identifiers, revision state indicators, and linkage information used to reconstruct or validate entry objects across sessions. Metadata does not represent substantive user-entered values, but rather provides the contextual framework that enables consistent execution, rendering, and auditing of the static electronic document.

In contrast, the term "execution data" refers to user-provided content or values entered during document execution, such as alphanumeric text, numeric values, check marks, signatures, attestations, or other data entered into an overlay entry object. Execution data is captured, versioned, and preserved through immutable event records that reflect changes over time, including timestamps, user identifiers, and reasons for modification. By separating metadata from execution data, the system enables a mutable operational state to be reconstructed from immutable event records while maintaining the immutability of the underlying static electronic document and preserving a complete, tamper-evident execution history.

The overlay entry object further includes a revision-state field that reflects the revision history of the entry object itself but does not store workflow-level attributes, and does not include any concurrency status because concurrency is managed dynamically by the server or browser and does not represent a persistent state of the entry. Storing metadata in this structured form enables the server or the browser to calculate rendering information using the normalized dimensions and coordinates without reprocessing the static electronic document, thereby reducing computational load and improving responsiveness on client devices, including devices with limited processing resources. The creation of the overlay entry object also enables revision tracking and state reconstruction at the data-structure level, rather than at the document-file level. For example, if the user later resizes an entry region or modifies a value, the system updates only the overlay entry object and does not modify or re-render the underlying document file. This approach prevents coordinate drift caused by differing viewport layouts and eliminates the need for multi-pass rendering algorithms, which normally require the client to calculate pixel offsets repeatedly. Because the overlay entry object stores the device-independent normalized coordinates, the server can reconstruct the object accurately regardless of device orientation, zoom level, or display resolution.

Additionally, the overlay entry object architecture prevents the static electronic document from ever entering a writable state. Although a user may export a copy of the executed document and subsequently alter that exported version, the original static electronic document stored within the system cannot be modified due to server-side controls, write-protection mechanisms, and integrity checks that enforce immutability. The system ensures that all user interactions occur only through overlay metadata rather than through any direct modification of the underlying document file. The document remains immutable at one or more times because one or more data-entry operations, user annotations, digital signatures, and revision actions occur within the overlay entry object stored externally from the document. This immutability provides a measurable technical improvement in document security and integrity. For instance, the system ensures that a high-value manufacturing record or regulatory compliance document cannot be corrupted by network errors, client-side rendering differences, or unauthorized modifications. This architecture further supports multi-user concurrency by allowing several users to create or interact with different overlay entry objects simultaneously without overwriting or locking the static electronic document.

In another embodiment, the overlay entry object is created either by the client device or the server using a memory-efficient object template optimized for incremental event generation, and the resulting metadata is always validated by the server before being persisted. This server-side validation confirms that the normalized coordinates, dimensions, entry type, and associated tag identifier comply with system rules and prevents unauthorized or malformed objects from being injected into the execution environment. Once validated, the server stores the overlay entry object data structure in persistent storage, ensuring that the authoritative version of the entry object is maintained independently of the rendered interface elements instantiated on the client device. This template may include preallocated pointer regions for event identifiers, hashing fields, revision markers, or flags indicating whether the user entered data meets validation criteria. Such structuring enables the server to associate each overlay entry object with its corresponding immutable event records without duplicating state information or scanning the static electronic document. This reduces processing overhead, lowers network traffic, and provides a technical solution to the problem of maintaining synchronized document state in distributed execution environments.

By creating the overlay entry object as a standalone structure associated with normalized coordinates and stored separately from the static electronic document, the system provides a concrete improvement in the functioning of document execution platforms. The overlay entry object itself represents the current mutable state of the entry, but every mutation applied to that state is recorded as an immutable, append-only action in the event ledger. Each logged action captures the exact parameters of the change, including updated coordinates, dimensions, values, and revision information, enabling the server to reconstruct a complete historical timeline of the entry object by parsing and replaying the individual action records. This architecture decouples transient state from permanent audit history, ensuring that the authoritative document state can evolve while maintaining an unalterable, fully traceable record of all changes, thereby improving reliability, auditability, and operational integrity compared to traditional document-editing systems. The system reduces rendering overhead, eliminates the need for direct file edits, preserves device-independent object positioning, enhances concurrency control, and maintains full traceability of one or more modifications without altering the static original document. These improvements are technical in nature and address deficiencies in traditional document-editing and form-rendering systems that rely on modification of the underlying document file.

In some embodiments, the device-independent normalized coordinates associated with an overlay entry object identify a position within a normalized layout space corresponding to a rendered page of a static electronic document. The normalized coordinates themselves represent positional values within that layout space and do not inherently encode higher-level contextual information such as document identity or workflow identity. Instead, page context, document context, and workflow context are maintained through logical associations stored alongside the coordinate values.

For example, normalized origin-point coordinates and normalized entry-box coordinates may be stored in association with a page identifier identifying a specific page within a document, a document identifier identifying the static electronic document to which the page belongs, and a workflow identifier identifying the workflow or binder instance in which the entry object was created. In this manner, the system preserves a clear separation between positional data and contextual scoping data, allowing the same coordinate representation to be reused across different documents or workflow instances without ambiguity.

In other embodiments, the page identifier, document identifier, and workflow identifier may be treated collectively as part of a coordinate reference tuple used by the system to resolve the logical location of an entry object. Regardless of representation, the system maintains sufficient linkage information to uniquely and unambiguously associate each overlay entry object with its location within a specific page, document, and workflow context. This approach enables accurate reconstruction, auditing, and replay of execution activity while avoiding unnecessary coupling of coordinate values to workflow-specific semantics.

As shown in FIG. 1B, at block 112, the server receives user entered data for the overlay entry object. The nature of the user entered data may vary depending on the type of workflow, the category of document being executed, or the permissions of the user interacting with the client device. In one example, the user entered data may comprise numerical values corresponding to measurements, quantities, lot numbers, batch parameters, or inspection results. For instance, a manufacturing operator may enter “27.5” to record a recorded weight, “1450” to indicate a pressure value, or “10.2 mL” to log a volumetric measurement. The server receives the numerical value as an input string or structured numeric payload and stores it within the overlay entry object.

In another example, the user-entered data may include alphanumeric text such as operator notes, procedural confirmations, initials, identification strings, or longer free-text entries. The system supports text of varying length, including multi-sentence statements or substantially long strings of narrative input. For instance, a user may enter “Completed per SOP 422,” “Deviation noted and communicated to supervisor,” “Operator: JASmith,” or an extended note describing an observation or procedure. The server associates the entered text with the unique identifier of the overlay entry object and records its placement relative to the normalized origin-point coordinates and normalized entry-box coordinates. This metadata is then stored as part of the authoritative state of the entry object and appended to the immutable event record to ensure complete traceability of both the content and its positional context within the executed document. In yet another example, the user entered data may include binary-state indicators such as check marks or toggle selections. For instance, an operator may tap a square box to signify that a condition has been met, that a calibration was performed, or that a procedural precondition was satisfied. The client device transmits the selection event to the server, and the server updates the metadata structure of the overlay entry object to reflect that the check mark is present, including the timestamp and user identity associated with the action.

In some embodiments, the user entered data may include an electronic signature or attestation. For example, a supervisory reviewer may apply a typed or certificate-based signature, which the system stores as part of the overlay entry object and marks as a signature-level event. In other scenarios, the signature may be a drawn signature input by a stylus, mouse, or touch event. The system may also capture a full electronic signature that requires user authentication through one or more credential mechanisms, including a full login password, an abbreviated password, two-factor authentication, or biometric verification. These authentication-backed signature events are recorded as part of the immutable event history and may be applied at the page level or document level to indicate user attestation, completion of required steps, or authorization of the executed content. The server stores a vector representation or raster representation of the signature and associates it with the corresponding overlay entry object, along with audit-critical metadata such as a certificate identifier, signing reason, or regulatory compliance code.

Additional examples of user entered data include timestamp confirmations, witness notations, operator initials, inspection observations, pass/fail selections, numerical ranges, barcode scans, QR-code derived text, and machine-generated inputs such as sensor values or automated field completions. For example, a handheld scanner paired with the client device may transmit a lot code such as “LOT-2025-B42” directly into an overlay entry object, and the server captures the scanned identifier as the user entered data.

Regardless of the data type, the server associates each piece of user entered data with the overlay entry object by updating the metadata structure linked to that object. The metadata structure may include fields such as a value field, a revision-history field, a timestamp, a user identifier, an Internet Protocol address, a session identifier, and either a reference to the normalized coordinates associated with the overlay entry object or a reference to the unique identifier assigned to that overlay entry object. These references allow the system to associate each recorded value or event with the correct entry object while preserving the positional and logical relationships defined during document execution. The server may also generate a new revision entry for the overlay entry object when the user-entered data constitutes a change from a previous state. In systems where the overlay entry object is initially created on the browser, the updated metadata is transmitted to the server, which validates the change and then generates and stores the corresponding revision entry in persistent storage. In other implementations, the overlay entry object may be created directly on the server, in which case the server likewise detects the state change and generates the appropriate revision entry. In both scenarios, each revision entry is appended to the immutable event history associated with the overlay entry object, ensuring that the full progression of changes can be reconstructed accurately and without loss of fidelity. This revision is stored as an immutable event record as described in block 114, ensuring that each user action is permanently captured and auditable without modifying the underlying static electronic document.

At block 114, the server generates an immutable event record. The immutable event record includes either the normalized coordinates associated with the overlay entry object or the unique identifier assigned to that overlay entry object, along with the dimensions of the entry box, the user-entered data, a timestamp, a user identifier, an Internet Protocol address, and a session identifier. These fields collectively capture the full contextual state of the entry at the time of the event, enabling precise reconstruction of the user interaction and preserving a tamper-evident audit trail for the executed document. The immutable event record captures the complete contextual state of the overlay entry object at the time of modification and provides traceability for subsequent auditing or review.

As noted above, the server generates an immutable event record corresponding to the user entered data and the associated overlay entry object. In one embodiment, the immutable event record is generated using a specialized event-construction routine executed by the server that aggregates device independent normalized coordinates or the unique identifier, the dimensions of the overlay entry object, the content of the user entered data, a timestamp, a user identifier, an internet protocol address, and a session identifier into a structured, append-only data object.

In some embodiments, the system generates immutable event records that document changes made to an overlay entry object during execution of a static electronic document. Each immutable event record is structured as an append-only data element stored in a tamper-evident ledger maintained by the server. Unlike conventional systems that store complete field states at each modification step, the system utilizes a sparse-record event protocol in which each event record contains only the attributes that were altered during the corresponding user interaction, while non-modified attributes are left blank, null, or otherwise unpopulated.

When an overlay entry object is created, an initialization event record may be generated to establish its baseline configuration, including a unique identifier, normalized origin-point coordinates, normalized entry-box coordinates, initial bounding-box dimensions, an entry-type designation, and any predefined field properties. Subsequent user interactions, such as text entry, dimension changes, repositioning of the entry box, tag assignment, or revision actions, result in the creation of new event records that contain only the specific attributes that changed relative to the previously recorded state. For example, when a user modifies only the bounding-box height and width of an entry box, the corresponding event record includes fields describing the new height and width values, while metadata such as entry text, revision identifiers, origin-point coordinates, and prior values remain unpopulated in that event record.

At the server, the event ledger is configured to reconstruct the complete historical or current state of an overlay entry object by replaying the chronological sequence of event records associated with that object. During reconstruction, the server iteratively merges populated fields from each event record into an accumulating state model while preserving the temporal ordering enforced by the ledger's monotonic index or cryptographic hash chain. Blank or null attributes in a given event record indicate that the value should be inherited from the most recent preceding event record in the sequence. This replay-based reconstruction enables deterministic recovery of both intermediate and final states of the overlay entry object without requiring the system to store full object snapshots after each modification.

In some embodiments, the sparse-record model reduces the storage overhead associated with maintaining large volumes of document-execution activity, particularly in workflows involving frequent revisions or multi-user interaction. Because the server stores only changed attributes per event, the system lowers database write load, enhances throughput, and minimizes the computational resources required to persist repetitive or unchanged values. Additionally, the immutable nature of the ledger ensures that all intermediate states of the entry box, including transient states that occur during iterative user interaction, are preserved with cryptographic integrity guarantees. This provides a tamper-evident audit trail suitable for compliance-sensitive environments that require traceability of all modification events.

During reconstruction, the server may also validate each event record for structural completeness, integrity of hash links, monotonic sequencing, and compatibility with expected field types derived from the overlay entry object definition. If a later event record changes an attribute such as the entry text, the server retains the earlier text value as part of the replay sequence, enabling complete revision history analysis. In some embodiments, sparse reconstruction may be performed on the server when rendering the current state to a client device, or may be performed by the client device using a cached subset of event records supplied by the server to reduce network overhead.

The event-ledger architecture improves the functioning of the computing system by enabling high-frequency state updates without requiring expensive full-object rewrites, by ensuring immutability without relying on external version-control systems, and by providing deterministic reconstruction of object states even when individual event records contain only partial attribute snapshots. This incremental-state protocol also supports scalable operation across distributed or multi-user workflows, where numerous events may be generated concurrently and must be sequenced with strict ordering guarantees to preserve state consistency.

In contrast to conventional systems that overwrite prior entries or update fields in-place, the disclosed system constructs each event record using a non-revisable, write-once architecture.

In some embodiments, the system implements tamper-evident sequencing of event records using a combination of controlled database access, structural linking, and integrity-verification mechanisms. The backend database that stores event records is not directly accessible to end users or client devices; instead, all interactions occur exclusively through validated server-side interfaces. This architecture prevents users from modifying stored event data and ensures that only authenticated server processes may write new event records to the ledger. Although, in theory, an internal administrator or insider could attempt to alter historical records, the system employs layered physical, programmatic, and policy-based controls, including access-restricted schemas, role-based permissions, write-once pathways, and cryptographically verifiable link structures, to ensure that any such unauthorized modification would be detectable through forensic evaluation.

In certain embodiments, each event record is assigned a sequence identifier that monotonically increments within the context of a workflow instance. The server may compute a cryptographic hash or checksum over the contents of each event record and may incorporate the hash of the immediately preceding event record into the newly generated hash value. This produces a hash-chained ledger in which each record is structurally linked to the record before it. If an attempt is made to modify an earlier record, the hash of that modified record will no longer match the expected value referenced by all subsequent records, thereby causing downstream validation checks to fail. This chaining mechanism provides a tamper-evident structure that enables the system to detect unauthorized changes to any historical event record, even when the database itself is housed in a restricted or trusted environment.

The combination of access-restricted storage, monotonic sequencing, and cryptographic linking constitutes a technical improvement over traditional audit-log implementations, many of which rely on mutable database entries that can be overwritten, truncated, or replaced without detection. By embedding structural integrity constraints directly into the data model and recording event data through an append-only interface, the system provides material enhancements to the reliability and trustworthiness of document-execution records. These improvements include: (i) a deterministic record of event ordering, (ii) cryptographic detectability of unauthorized modification attempts, (iii) the ability to perform full ledger validation using hash-chain reconstruction, and (iv) prevention of silent tampering by restricting write-access to controlled server processes. When evaluated together, these features provide a computer-specific, architecture-level enhancement that materially improves the functioning of a document-execution system and the underlying data-management technologies used to preserve immutable records.

In some embodiments, the event record generation step uses low-latency, server-side memory optimizations that prevent the client device from re-rendering the underlying static electronic document. Because the normalized coordinates of the overlay entry object are stored directly in the event record in a device independent form, the client device does not rely on pixel-based screen measurements that would otherwise require recalculation or triggering of additional rendering passes. This reduces computational load on the client device, particularly for high-resolution displays or mobile devices with limited processing resources, and improves responsiveness during multi-user collaborative execution.

In an example implementation, the immutable event record may include both the pre-change and post-change states of the overlay entry object, enabling deterministic reconstruction of any prior revision of the workflow instance. For instance, when a user corrects a numeric value from "1450" to "1480," the server generates an immutable event record that captures only the revised value, the reason for the revision when required, and the associated action metadata, including a timestamp, a user identifier, a session identifier, and device context information. The server does not need to restate the original value within this new record, because the original value already exists in a prior immutable event record associated with the same overlay entry object. During later reconstruction of the entry state, the system replays the full sequence of event records in chronological order, allowing earlier records to supply unchanged attributes, such as the previous value, while later records supply only the updated fields. This sparse record approach reduces redundant data storage, prevents unnecessary duplication of unchanged values, and ensures that every alteration is captured through an append only progression of immutable, time ordered records. The immutable event record, therefore, enables the server to reconstruct the full timeline of modifications without reprocessing the static electronic document or recalculating historical coordinate values.

In another embodiment, the immutable event record may include operational environment metadata collected by the server or the client device during the execution action. This metadata may include a device type, a browser version, viewport dimensions at the time of entry, network characteristics, or other contextual information available to the system at the moment of interaction. Although the system can obtain this information and may associate it with the entry for completeness, the primary use of this metadata is to document the conditions under which the normalized coordinates were generated and presented to the user. In typical implementations, the normalized coordinates are transmitted to the client device and the client side code adjusts the rendered overlay for presentation. While the system could compare environmental metadata against expected coordinate mappings, such metadata is generally not used for automatic error detection or diagnosis. Instead, it provides an optional contextual record that supports later review or troubleshooting if manual analysis becomes necessary. In further embodiments, the event record generation process employs a distributed ledger compatible format or a block-structured storage mechanism. For example, multiple event records may be grouped into blocks associated with individual workflow steps, document pages, or predefined workflow phases. Each block may include integrity metadata such as a Merkle root, enabling efficient integrity verification without requiring scanning of every individual event. This significantly reduces computational overhead for large workflows while providing a technical improvement in auditability and scalability.

By generating an immutable event record that includes normalized coordinates and device-specific metadata, the system provides a technical solution to problems associated with coordinate drift, viewport scaling inconsistencies, and loss of traceability in distributed document execution environments. The event records maintain deterministic positioning independent of the client hardware, avoid re-rendering of the static document, and ensure that each update is recorded in an append-only, tamper-evident structure. These features constitute concrete improvements to computer functionality and distributed data-management systems, not merely abstract recordkeeping.

At block 116, the immutable event record is stored in an append only event ledger implemented using a tamper evident structure. The event ledger prevents modification or deletion of prior records and ensures that one or more state changes remain permanently recorded. The tamper evident structure may include a monotonic indexing sequence, chained hashing, or other mechanisms that prevent retroactive alteration of ledger entries.

As noted above, the server stores the immutable event record in an append only event ledger implemented using a tamper evident data structure. The append only event ledger is architected to store sequential event records without permitting in-place modification, overwriting, or deletion of previously stored content. This structure provides a technical improvement over conventional logging mechanisms, which typically rely on mutable tables or editable audit fields that may be overwritten or altered by subsequent operations, system faults, or client-side rendering inconsistencies.

In one embodiment, the append only ledger is implemented as a monotonic sequence of event objects stored with strictly increasing sequence identifiers. Each event record is written to a newly allocated ledger position, and the ledger maintains no API or internal mechanism for revising or deleting occupied positions. The monotonic identifiers allow the system to verify the temporal order of events without performing costly full-file scans or reprocessing of the static electronic document. This architecture also avoids concurrency conflicts because multiple users may generate sequential event records without requiring exclusive locks on the ledger structure.

In another embodiment, each event record includes a cryptographic or hash-based linkage to a previous event record, forming a chain of hash-dependent entries. For example, the server may compute a hash of the newly generated immutable event record and concatenate the hash with the hash of the immediately preceding event record. This chained-hash structure provides a tamper evident property because altering any prior event would necessarily change the output hash of that event and one or more dependent events, thereby making tampering immediately detectable through hash comparison. Such chained hashing constitutes a technical improvement over traditional audit log files, which can be modified without leaving computational evidence of alteration.

In additional embodiments, the append only ledger uses a block-oriented data-structure, in which multiple event records are grouped into blocks associated with workflow phases, document pages, or execution task categories. Each block may include a Merkle root computed over one or more event records in the block, allowing efficient verification of block integrity without recalculating hashes for each individual event. This reduces compute time, improves scalability for large workflows, and minimizes server-side memory utilization, providing concrete enhancements to the functioning of the computer itself.

The tamper evident structure also improves reliability in distributed or cloud computing environments. For example, when event ledger data is replicated across storage nodes or synchronized across multiple regions, the tamper evident chaining ensures that replicas cannot diverge silently. Any deviation in the stored ledger would be detected through mismatched sequence identifiers or invalid hash relationships, enabling automatic rollback or regeneration from a known good state. This provides a technical solution to data-consistency problems commonly encountered in distributed systems.

In another embodiment, the append only ledger stores metadata describing the storage conditions of each event record, such as write timestamps, replication status, or block validation flags. This allows the server to perform background integrity checks without re-rendering the static document or recalculating its positional relationships. Because the ledger stores normalized coordinates and does not rely on device-dependent measurements, the integrity verification pipeline avoids expensive graphical or pixel-level recomputation, thereby reducing CPU consumption and enabling efficient real-time audit querying.

By implementing the immutable event record storage using an append only tamper-evident structure, the system improves memory stability, data reliability, concurrency handling, and auditability in a manner not achievable with conventional document editing or logging approaches. The ledger ensures that one or more state changes remain permanently recorded in a cryptographically or structurally verifiable sequence, providing a specific improvement to computer functionality rather than an abstract concept of recordkeeping.

At block 118, the client device displays the overlay entry object and a visual indicator of the associated immutable event record within the viewport. The visual indicator may represent the presence of a recorded event, a revision, or a validation-related status. Because the system renders overlay entry objects independently of the static electronic document, the static electronic document remains unmodified at one or more times.

As noted above, the client device displays the overlay entry object within the viewport by reconstructing it from the metadata stored in the corresponding overlay entry object data structure. The client device also presents a visual indicator associated with the immutable event record, which may include an icon, a highlight, a boundary change, or another on screen element that signifies that one or more recorded actions exist for that entry. The indicator does not modify the underlying static electronic document. Instead, it is rendered entirely within the client side interface so that the user can view both the current state of the entry and the presence of its recorded history while preserving the immutability of the static document. In certain embodiments, the client device executes a lightweight rendering routine that composites the overlay entry objects on top of a pre-rendered image of the static electronic document without regenerating or rasterizing the underlying document content. This two-layer rendering architecture provides a technical improvement over conventional document-editing systems, which repeatedly re-draw or re-encode the entire document image upon each user interaction, consuming significant CPU/GPU cycles and introducing latency in low-power devices.

In one embodiment, the client device maintains a cached bitmap or vector representation of the static electronic document in off-screen memory. When a new overlay entry object is created or updated, the rendering routine redraws only the overlay layer and the corresponding visual indicator layer. Because the base document is stored in an immutable memory buffer and not re-rendered, the computational workload is substantially reduced. This selective compositing approach also prevents pixel shifting and misalignment that can occur when the underlying document is re-rendered at different zoom levels or on devices with differing pixel densities.

In another embodiment, the visual indicator is rendered using a hardware-accelerated overlay layer or a GPU-composited element that avoids reflow of the main document content. This implementation eliminates the cascading layout recalculations and reflow computations that ordinarily occur when modifying HTML or canvas-based forms, thereby reducing layout jitter and improving frame-rate stability. The resulting improvement in rendering performance is particularly significant in collaborative, multi-user sessions where updates may occur at high frequency.

In additional embodiments, the visual indicator is dynamically adjusted based on the state of the immutable event record. For example, the indicator may display a revision badge when the immutable event ledger includes multiple event records for the same overlay entry object. If the validation subsystem determines that an entered value violates a smart tag rule, the visual indicator may be drawn in a contrasting color or with a pulsing effect generated by GPU shaders to alert the user in real time. Such feedback is driven by event-state metadata rather than static formatting, thereby providing a programmatic rendering improvement that reduces the computational burden associated with polling, parsing, or re-evaluating the static document structure.

In some embodiments, the display pipeline supports asynchronous rendering. The overlay entry objects and visual indicators may be rendered using a separate execution thread or worker process that updates the overlay layer independently from the static document layer. This enables the static document to remain visually stable while overlay objects update in response to user input or server-sent events. Asynchronous rendering improves UI responsiveness and eliminates the visual flicker that occurs in systems where document and overlay content must be redrawn together.

Because the system renders the overlay entry objects and visual indicators independently of the static electronic document, the static document remains unmodified at one or more times. This separation of rendering layers also mitigates race conditions common in shared workflows. In traditional collaborative systems, concurrent edits may lead to document corruption or inconsistent visual states. By contrast, the disclosed system isolates the mutable overlay layer from the immutable document layer, enabling consistent rendering, predictable coordinate mapping, and reliable synchronization across distributed computing environments.

Altogether, these rendering techniques provide a specific, technical improvement to how computer systems display execution-related metadata over static documents. The approach reduces CPU/GPU usage, eliminates unnecessary re-rendering, ensures deterministic object positioning, improves responsiveness under multi-user load, and enhances overall stability of the rendering pipeline. These improvements are not abstract but instead modify the functioning of the computer itself and enable capabilities unavailable in conventional document editing or form overlay systems.

These techniques enable device independent execution and annotation of static electronic documents while ensuring immutability, traceability, and compliance with audit requirements. The separation between the static electronic document and the overlay metadata provides a technical improvement by preventing file corruption, reducing computational load associated with re-rendering, and/or maintaining stable coordinate positioning across heterogeneous execution environments.

The disclosed system provides several technical benefits that directly improve the functioning of computer systems, distributed processing environments, and document-rendering architectures. By employing device-independent normalized coordinates, the system achieves consistent placement of overlay entry objects across heterogeneous client devices, eliminating pixel-based drift that typically arises from differences in screen resolution, viewport resizing, browser zooming, or device rotation. This normalization reduces the computational overhead normally required to re-render a static document in response to viewport changes and improves efficiency for low-power or mobile devices. Because normalized coordinates remain stable regardless of the client rendering environment, the system also enhances multi-user concurrency by ensuring that edits from multiple users do not conflict, overlap, or misalign.

The use of overlay entry objects provides additional technical advantages. Since these overlay objects are stored separately from the static electronic document, the system keeps the underlying file immutable and avoids corruption or instability associated with writable file modes. Only the overlay layer is modified, allowing the static document to remain cached in memory and eliminating repeated read-write operations on large documents. This layered structure greatly enhances performance because updates to entry objects can be rendered without redrawing the document itself, reducing CPU/GPU load and improving responsiveness. The ability to reconstruct document state using overlay metadata, rather than reprocessing the static document, provides a further technical improvement in version control, state recovery, and historical auditability.

Another benefit arises from the append-only, tamper-evident event ledger. The ledger stores each event record using monotonic identifiers and optional chained-hash relationships, creating a data structure that prevents retroactive modification of prior entries. This design offers increased reliability and integrity in distributed or replicated environments, where divergence between replicas can be detected and corrected using hash comparisons. Block-based integrity mechanisms, such as Merkle roots, make it possible to verify the correctness of large numbers of event records without scanning each entry individually, thereby improving scalability and reducing computational cost. The append-only architecture also prevents partial-write corruption that may occur in traditional editable log files.

The system's rendering pipeline also provides significant technical improvements. The client device composites overlay entry objects on top of a cached representation of the static document, avoiding full-document re-rendering for each update. This reduces processing load, preserves consistent visual alignment across devices, and eliminates flicker or jitter associated with repeated rasterization. In some embodiments, the overlay layer is rendered asynchronously or through GPU-accelerated techniques, further improving frame-rate stability and making it possible to handle rapid multi-user updates without degrading performance. The deterministic placement of visual indicators, even after rotation, zooming, or resizing-results from the normalization and compositing strategies, which optimize the rendering behavior of the computing system itself.

For collaborative environments, the system eliminates file-locking issues because the static document never enters a writable state and multiple users can interact with independent overlay objects concurrently. Event-driven synchronization allows client devices to receive compact state updates rather than full document redraws, reducing bandwidth usage and improving overall network efficiency. The architecture also strengthens security and compliance by preserving high-value regulatory documents in immutable form while capturing non-repudiation metadata such as timestamps, IP addresses, and session identifiers for each user action. Because the system captures granular, immutable event data and keeps the document unmodified, it supports reliable forensic investigation and high-assurance audit trails.

Overall, the system improves computer functionality by reducing rendering overhead, eliminating unnecessary document reprocessing, enhancing concurrency and consistency management, strengthening data integrity, improving auditability, and ensuring stable device-independent behavior. These improvements are rooted in specific technical architectures and data-processing mechanisms and are not abstract organizational or business concepts, thereby providing clear technical benefits relevant to patentability under United States law.

In some embodiments, once a first committed user-entered value is stored for an overlay entry object, that object becomes coordinate-immutable. Subsequent modifications may update only the value-state metadata associated with that object, while the original normalized coordinates remain fixed. This guarantees stable positional reconstruction across heterogeneous devices regardless of viewport variations, enhancing multi-user synchronization and preventing coordinate drift during collaborative workflow execution.

In further embodiments, the system generates a deletion event record when an overlay entry object is hidden or visually removed. Rather than removing or modifying prior entries, the system stores the deletion event as another immutable record in the append-only ledger, preserving the full historical sequence of object states. This approach maintains complete audit fidelity and allows deterministic reconstruction of the workflow history without altering existing event data.

In another set of embodiments, the client device displays a human-readable visualization that includes the overlay entry object, its normalized coordinates, and a version history assembled from immutable event records. This visualization is rendered using a layered compositing technique that overlays metadata and state indicators on a cached representation of the static document rather than re-rendering the static document each time the overlay is updated. This approach reduces GPU and CPU usage, avoids unnecessary rasterization, and/or improves rendering responsiveness on both high-performance and resource-constrained devices.

Further, in some embodiments, the system applies an electronic signature to the workflow instance or to the static electronic document to transition the workflow from an execution state to a closure state. The electronic signature is recorded as an immutable event in the append-only ledger, enabling validation of workflow completion while maintaining immutability of the underlying static document. Because the system does not modify the document file itself, this approach provides stronger integrity facilitates and/or enhances compliance in regulated environments.

Figure 2:
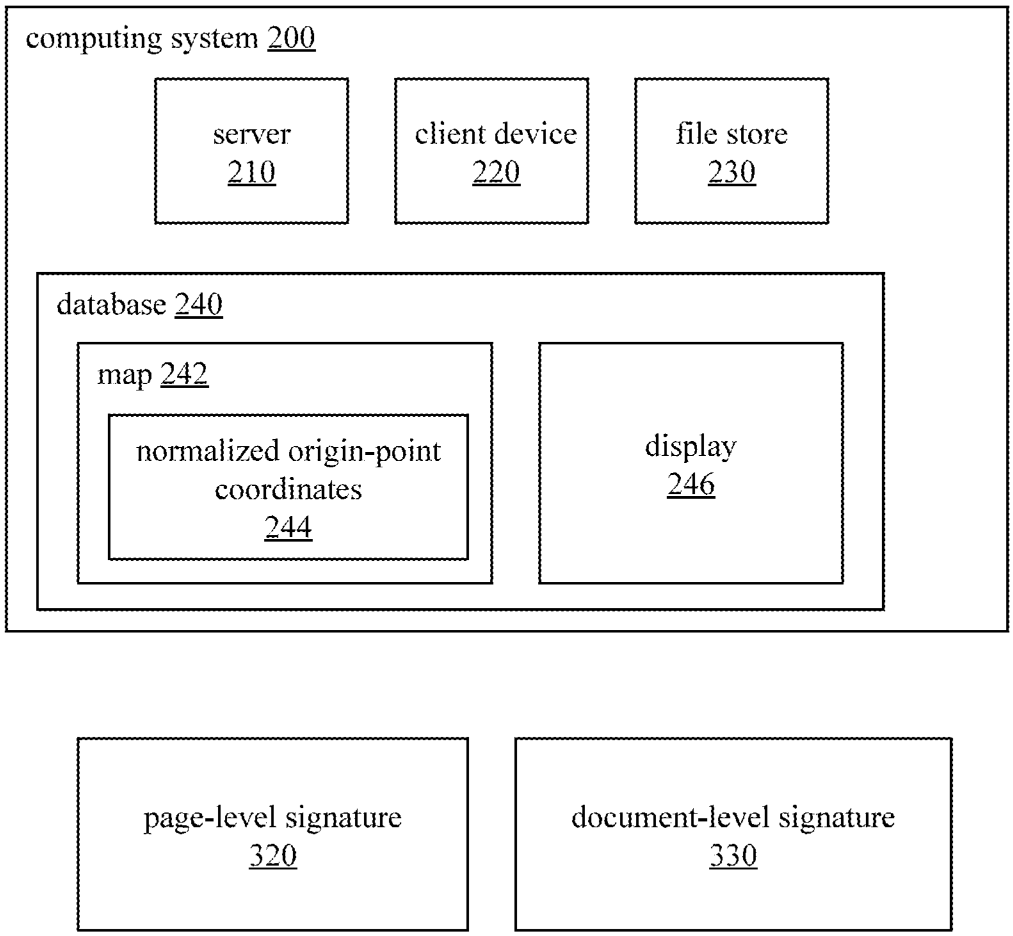
FIG. 2 is a block diagram illustrating a computing system, according to some embodiments of the present disclosure.

FIG. 2 illustrates an example computing system 200 configured to execute, manage, and preserve a device-independent record of user interactions with a static electronic document. As shown, the computing system 200 includes a server 210, a client device 220, a file store 230, and a database 240. Although depicted as discrete components, the elements of the computing system 200 may be implemented using any suitable combination of physical hardware, virtualized resources, cloud infrastructure, or distributed architectures. Communication among the components may occur over any wired or wireless network.

The server 210 is configured to receive a static electronic document in a read-only format and to store the document within the file store 230 as a write-protected artifact. The write-protected configuration prevents modification of the document content and ensures that all subsequent user actions performed during execution are stored as metadata in separate data structures without altering the underlying file. The static electronic document may include a PDF file, an image-based representation of a document, or a word-processing file converted to a non-editable format.

The client device 220 renders a visual representation of the static electronic document within a viewport displayed to the user. The viewport may be presented within a browser window, an application frame, or any render container capable of displaying the document at a resolution appropriate for interactive execution. As the user interacts with the viewport, the client device 220 detects selections of particular regions of the displayed document. For each such selection, the client device 220 generates raw viewport coordinates representing the pixel-space position of the interaction.

The raw viewport coordinates are mapped into device-independent normalized coordinates by either the client device 220 or the server 210. The mapping operation uses baseline dimensions defined by a set-sized zoom wrapper configured to maintain fixed CSS pixel ratios irrespective of browser-level zoom. This wrapper enables the system to produce normalized origin-point coordinates identifying an anchor location on the static electronic document, and normalized entry-box coordinates identifying an initial placement for an entry box. By operating within the zoom wrapper, the system preserves coordinate relationships across heterogeneous devices and viewport configurations.

In certain situations, such as when a user applies a system-controlled zoom operation or manually resizes or repositions an entry box, a transform engine executed by the client device 220 or the server 210 applies coordinate-transform adjustments. These adjustments update the normalized entry-box coordinates while preserving the normalized origin-point coordinates, thereby ensuring that entry boxes remain visually tethered to their anchor points even when moved by the user. The transform engine is configured to reconcile interaction coordinates with the normalized layout coordinate space during system-facilitated canvas zoom changes and user-initiated entry box movement or resizing operations. By converting mouse-derived coordinates obtained from the visually scaled canvas back into normalized coordinates, the transform engine ensures that repositioned or resized entry boxes remain logically consistent with their stored metadata and continue to be rendered correctly relative to their origin points when the canvas zoom level changes.

The server 210 creates an overlay entry object data structure associated with the normalized origin-point coordinates and normalized entry-box coordinates. The overlay entry object data structure stores metadata describing the entry object, including its coordinates, type attributes, and bounding-box dimensions, but does not store or render the visual entry box itself. Instead, the rendered representation is generated dynamically on the client device 220. The server stores the overlay entry object data structure in the database 240, which is maintained separately from the static electronic document such that the document remains immutable. In FIG. 2, the database 240 includes a map 242, which may store normalized origin-point coordinates 244, and a display structure 246 that provides retrieval context for rendering operations.

As users enter data into the entry box, the server 210 receives the user-entered data and associates it with the corresponding overlay entry object data structure stored in the database 240. The server then generates an immutable event record that includes the normalized origin-point coordinates, normalized entry-box coordinates, one or more dimensions associated with the entry object, the user-entered data, a timestamp, a user identifier, an Internet Protocol address, and a session identifier. Each event record is written to an append-only event ledger implemented using a tamper-evident structure, such as a monotonic sequence index, a hash-linked chain, or a write-once logging mechanism, that prevents modification of prior event records and enables reconstruction of the entire execution history.

In some embodiments, when the user initiates creation of a new entry region, the browser generates a preliminary representation of the entry object for immediate on-screen interaction. This representation is implemented as an HTML or script-level construct that visually reflects the proposed position, dimensions, and entry type. Upon submission of the creation action, the client device transmits the preliminary metadata to the server, where the server generates, or validates if pre-generated by the browser, a unique identifier for the entry object. The server then records an initialization event documenting the creation of the overlay entry object within the workflow instance. The overlay entry object stored in the server-side database is a structured data record that persists independently of the transient HTML representation rendered on the client. Thus, while the client-side HTML object provides an interactive interface for the user, the authoritative overlay entry object is maintained server-side and includes the normalized origin-point coordinates, normalized entry-box coordinates, bounding-box dimensions, entry type information, revision metadata, and any associated tags or attributes. This separation ensures that the static electronic document remains immutable, that all authoritative state transitions occur under server control, and that each creation or modification event is securely logged in the append-only event ledger.

The client device 220 displays an entry box rendered from the metadata contained in the overlay entry object data structure. A visual indicator representing one or more immutable event records is presented within the viewport to enable the user to understand the current state of the entry and to view the presence of associated historical actions. As shown in FIG. 2, the system may support page-level signatures 320 and document-level signatures 330, which may be applied to transition a workflow from an execution state to a closure state. Such signatures do not alter the underlying static electronic document; instead, they are recorded as additional immutable event records stored within the database 240. The architecture illustrated in FIG. 2 enables device-independent execution of static documents, preserves immutability of the underlying files, and provides a complete and tamper-evident history of all user interactions by storing execution metadata and event records separate from the document itself. This structure allows the system to maintain high rendering performance on the client device, ensure secure and traceable execution of document workflows, and provide reliable auditability across distributed environments.

In some embodiments, the computing system relies on CSS pixel dimensions defined by a fixed-dimension canvas associated with a set-sized zoom wrapper. The zoom wrapper establishes a stable rendering environment in which the CSS pixel grid is preserved regardless of variations introduced by browser-level zoom, operating-system scaling, or viewport resizing. The wrapper effectively acts as a controlled rendering container: while the browser may zoom the full page, the zoom wrapper ensures that the internal coordinate system applied to the static electronic document remains invariant. This allows the system to map raw viewport coordinates, generated when the user selects a region on the rendered document, into normalized coordinates that are independent of device hardware, display resolution, or browser settings. The normalized origin-point coordinates and normalized entry-box coordinates maintain consistent geometric relationships within the wrapper, enabling reproducible re-rendering across client sessions and devices without requiring recalculation of the underlying PDF.

In some embodiments, the client device or the server executes a transform engine configured to perform coordinate-transform adjustments in response to specific interaction events. Such adjustments are applied when a system-controlled zoom operation is active and the user performs a manipulation of an entry box, including resizing, dragging, or repositioning of the entry box on the rendered document. The system-controlled zoom is implemented through a visual scaling operation applied to a fixed-dimension zoom wrapper, rather than through browser-level zoom, such that the underlying layout dimensions remain unchanged. During these interaction events, the transform engine converts mouse-derived coordinates obtained from the visually scaled canvas into normalized coordinates corresponding to the fixed layout space. The transform engine updates the normalized entry-box coordinates based on the interaction, while preserving the normalized origin-point coordinates, thereby maintaining the logical anchor location on the static electronic document while allowing flexible visual adjustment of the entry box under system-facilitated zoom conditions.

When the user drags or resizes the entry box, the transform engine recalculates the entry-box coordinates by applying translation vectors, resizing deltas, or shape transforms relative to the original mapped coordinate system. These operations guarantee coordinate consistency without requiring the full document to be re-rendered at new dimensions, thereby reducing computational overhead and eliminating latency that would otherwise burden low-resource client devices.

In some embodiments, upon creation of an overlay entry object data structure, the server assigns a unique identifier using a sequential numeric or alphanumeric convention. This identifier may be generated directly by the server or provisionally generated by the client device and validated by the server. The unique identifier is stored in association with the normalized origin-point coordinates, the normalized entry-box coordinates, and a page identifier. In more advanced embodiments, distinct identifiers may be maintained for different workflow states, including a permanent core identifier, a temporary identifier applied only after permanence is established, and a user-visible page-level identifier reflecting execution order on the page. This multi-tiered identification system enables complete reconstruction of entry ordering, supports reviewer navigation, and separates user-facing identifiers from internal system tracking identifiers.

In some embodiments, the append-only event ledger is designed to enforce immutability through structural constraints implemented at the data layer. The ledger may utilize a monotonically increasing sequence number to encode the temporal order of event submissions. In more robust embodiments, each record may include a cryptographic hash that incorporates both the content of the record and the hash of its immediately preceding record, forming a hash-linked chain. This tamper-evident chaining allows the system to detect retroactive changes, even by privileged users, because any alteration of a prior record invalidates the downstream hashes. The ledger may be stored in a restricted-access schema within the database, or in some implementations, may be mirrored to a read-append-only repository for organizational compliance or regulatory storage requirements.

In some embodiments, once an initial committed user-entered value is associated with the overlay entry object data structure, the system transitions the origin-point coordinates to an immutable state. After this transition, the entry box rendered by the client device remains logically and visually tethered to the origin-point coordinates, regardless of subsequent resizing or repositioning. In certain graphical implementations, a line, anchor symbol, or other visual indicator connects the entry box to the origin point, preserving interpretability for reviewers and auditors. This tethering ensures that historical associations between entry content and specific document regions cannot be lost through user interaction or manipulation.

In some embodiments, to prevent intermediate or unintentional values from persisting, the client device restricts users from exiting an active input action or initiating another entry until the current entry is either cleared or submitted. This workflow control guarantees that no ambiguous or unsaved states can arise within the execution environment. The server receives and persists data only upon submission, thereby enforcing atomicity between user action and event record creation.

In some embodiments, if a user deletes, hides, or otherwise removes an entry box from view, the server generates a deletion event record. Rather than eliminating the historical presence of the entry box, the deletion event is appended to the immutable event ledger, ensuring complete traceability. Reviewers may view the deletion event to determine whether an entry was removed, by whom, and at what time.

In some embodiments, the client device renders a human-readable visualization that may include: a representation of the entry box; the normalized origin-point coordinates; the normalized entry-box coordinates; shape dimensions; and a detailed version history reconstructed from the event ledger. This visualization allows reviewers to inspect the evolution of each entry, including initial creation, value changes, resizing, tag assignments, reasons for revision, and deletion events. Such a visualization supports audit workflows without modifying the underlying static electronic document.

In some embodiments, the system supports electronic signatures applied to at least a portion of the static electronic document. The signatures may include page-level signatures, document-level signatures, or workflow-level signatures. Signature authentication mechanisms may require credentials, abbreviated passwords, multi-factor authentication, or biometric validation. Once applied, the signature may cause certain sections of the workflow to enter a locked state, preventing further modification unless a formal re-execution or reopening process is initiated.

In some embodiments, when a modification is made to a previously committed value, the server records a reason-for-change provided by the user. This creates a richer audit trail that captures not only what changed, but why the change was made. Such metadata is stored as part of the immutable event record.

In some embodiments, the server reconstructs an entry box on the client device by parsing metadata stored in the overlay entry object data structure and replaying the sequence of immutable event records. Because the static electronic document remains in a read-only state, the entire interactive layer is recreated solely from metadata, enabling the system to restore the exact state of execution across sessions, devices, or during archival review. Reconstruction logic may include interpretation of dimension vectors, tag assignments, revision sequences, and positional updates.

Figure 3:
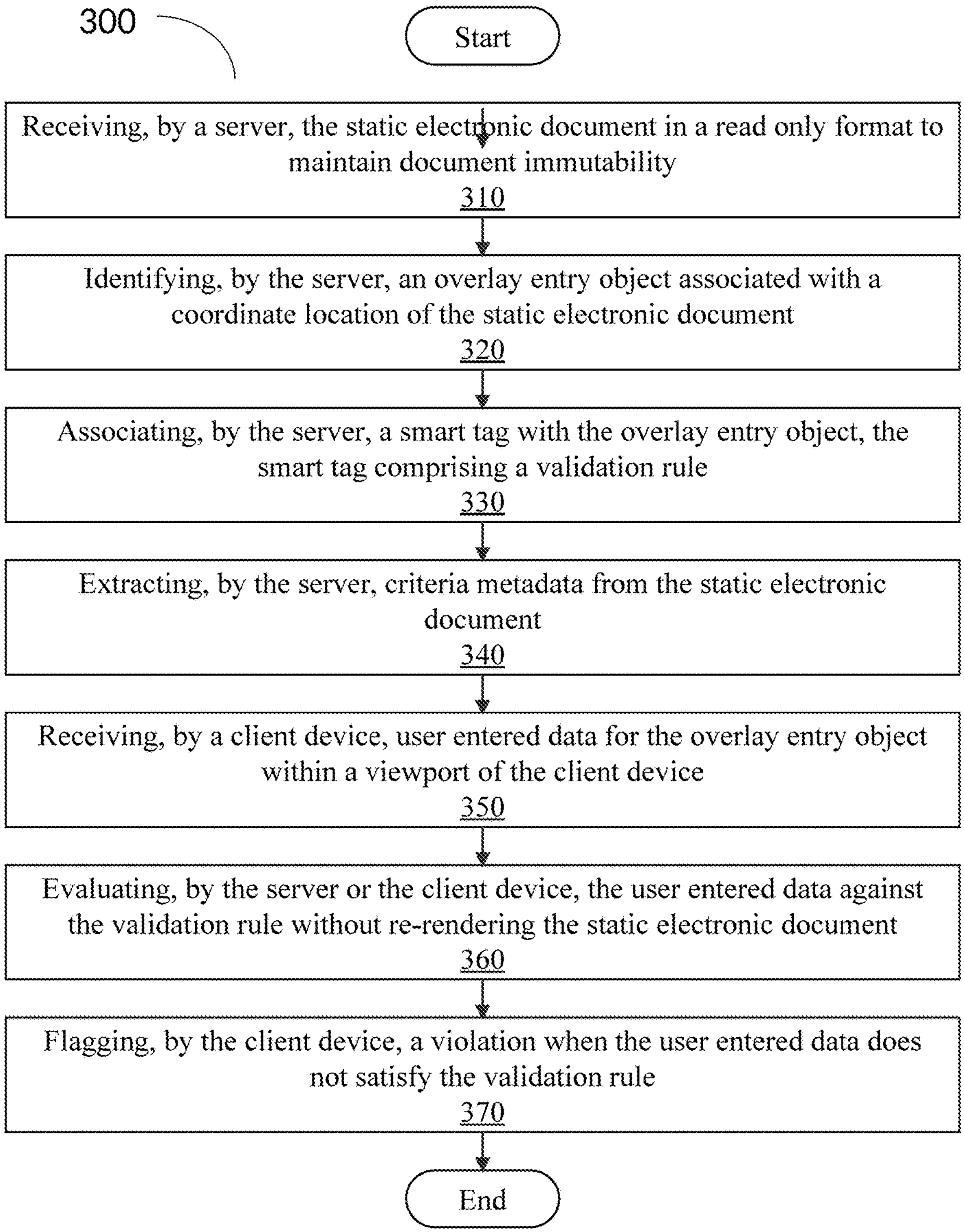
FIG. 3 is a flowchart illustrating a computer-implemented method, according to some embodiments of the present disclosure.

FIG. 3 illustrates an embodiment of a computer-implemented method 300 for dynamic validation of data entered into overlay entry objects associated with a static electronic document. The method provides a technical improvement to document-execution computing systems by enabling validation of user input without modifying or re-rendering the static electronic document. This architecture reduces graphical processing load, decreases rendering latency, preserves immutability of regulated documents, and improves integrity of validation operations across heterogeneous client devices.

At block 310, the server receives the static electronic document in a read only format to maintain document immutability. The static electronic document is stored in a protected, write-prohibited structure within the system to prevent accidental or malicious alteration. By enforcing immutability at the server level, the system eliminates a common source of corruption observed in conventional document-execution tools where editable documents must be repeatedly opened, modified, and saved. Maintaining the file in a read only format improves stability and preserves the semantic and regulatory fidelity of execution documents.

At block 320, the server identifies an overlay entry object associated with a coordinate location of the static electronic document. The overlay entry object is a computer-generated data structure positioned according to the document's coordinate system. It functions as a discrete container for metadata and user-entered values without requiring modification of the underlying file. This arrangement improves system performance by allowing the server to manipulate, validate, and store data independently of the static electronic document, thereby avoiding high-cost file rewrites or page regenerations that occur in traditional systems that embed execution data directly into the document.

At block 330, the server associates a smart tag with the overlay entry object. The smart tag includes a validation rule such as a numerical range, expected entry type, character pattern, or validation mask. Associating the smart tag at the data-structure level enables the computing system to apply specialized constraint logic to user input. This architecture replaces manual, error-prone downstream verification processes with machine-executable validation that is both deterministic and standardized across users. Because the validation logic attaches directly to the overlay entry object, the system can execute dynamic constraints regardless of the format of the underlying static electronic document.

At block 340, the server extracts criteria metadata from the static electronic document using one or more automated processes such as optical character recognition, text extraction, or document metadata parsing. Extracted metadata may include predefined acceptable ranges, threshold values, field semantics, or device-originated constraints encoded in the document. The computing system uses this extracted metadata to automatically configure the validation rule, reducing the need for human interpretation and minimizing the likelihood of misconfigured or inconsistent validation logic across different instances. This automated extraction constitutes a technical improvement because the validation constraints are produced from deterministic machine parsing rather than manual programming.

At block 350, the client device receives user-entered data for the overlay entry object within a viewport of the client device. The viewport visually renders the static electronic document while maintaining a separate layer for dynamic overlay objects. The user-entered data is captured in real time and transmitted to the server or validated locally depending on the architecture. The system does not modify or re-draw the underlying static electronic document during data entry, which reduces graphical workload and improves rendering stability on devices with limited processing capability such as mobile devices, embedded displays, or thin clients.

At block 360, the server or the client device evaluates the user-entered data by applying the validation rule associated with the tag assigned to the overlay entry object. Because the validation logic is encapsulated within the tag rather than embedded directly within the entry box, the system decouples rule processing from the rendering and storage of the entry object itself. This decoupling provides a technical improvement by enabling consistent rule enforcement, simplified rule updates, and reduced processing overhead when large documents contain numerous entry boxes. The evaluation operation is performed using the overlay entry object's stored metadata, including its unique identifier and normalized coordinates, and does not require re-rendering or modifying the static electronic document. This separation between the immutable document, the entry object data model, and the tag-based validation logic allows the system to perform real-time data checking while maintaining document immutability and ensuring deterministic behavior across heterogeneous client devices. This provides a technical advantage by decoupling validation logic from document rendering. Traditional systems that embed field representations directly within document pages often require full or partial regeneration of the document each time a field undergoes evaluation, resulting in latency, network overhead, and reduced responsiveness. In contrast, the disclosed method performs validation against metadata structures that exist outside the static electronic document, enabling faster evaluation, improved energy efficiency on portable devices, and reduced memory usage and bandwidth consumption.

At block 370, the client device flags a violation when the user-entered data does not satisfy the validation rule. The client device may generate a real-time visual indicator at the overlay entry object location, including color transitions, border highlighting, graphical icons, or contextual tooltips. Because the system evaluates and displays validation outcomes without altering or re-rendering the static electronic document, the document remains immutable while the user receives immediate feedback. This real-time feedback loop improves accuracy of data capture, enhances user performance, reduces downstream correction workload, and provides a technical solution to the computational inefficiencies inherent in legacy document execution environments.

Figure 4:
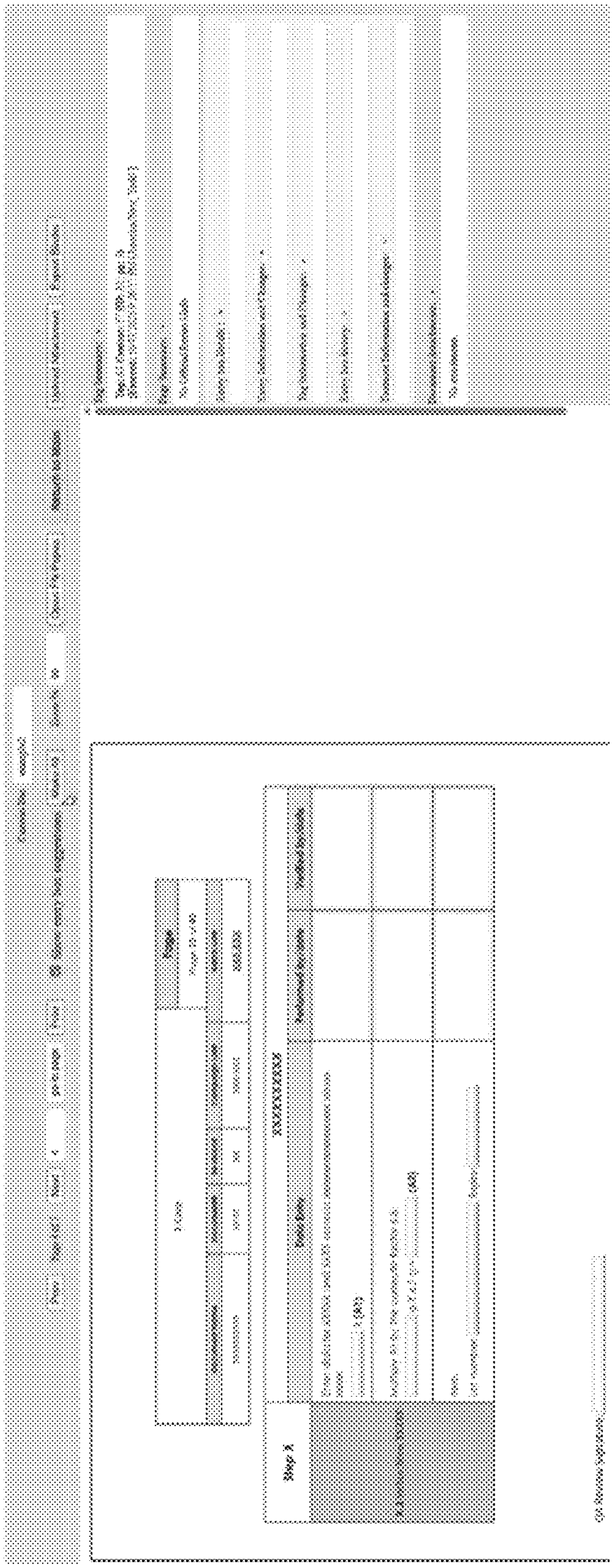
FIG. 4 is an illustration of a device showing an operational sequence displayed on a client device when a user interacts with the electronic document execution system, according to some embodiments of the present disclosure.

FIG. 4 illustrates an operational sequence 400 that occurs when the system is executed on a client device under the control of a logged-in user. The system supports concurrent multi-user access, and therefore the interface rendered in FIG. 4 reflects the state of the workflow instance as maintained by the backend server at the time of display. The client device is authenticated to the server, and the server transmits a rendering descriptor corresponding to the static electronic document to the client device, which then renders the static electronic document within a viewport. The rendered document in FIG. 4 is a PDF document presented in a read only format such that its underlying structure and content remain immutable throughout execution.

The system includes smart region-identification logic that analyzes the pixel structure, text layout, bounding boxes, and tabular regions of the static electronic document to identify candidate entry locations. These candidate locations appear to the user as selectable visual regions, shown in FIG. 4 as outlined boxes and recognizable data fields. When the user selects one of these regions, the client device transmits a coordinate selection event to the server that includes the raw viewport coordinates, the page identifier, the dimensions of the selected region or proposed entry box, and any relevant local device rendering parameters. These transmitted values enable the server or client-side transform logic to accurately determine the normalized origin-point coordinates and normalized entry-box coordinates, ensuring that the resulting overlay entry object remains device-independent and can be reconstructed consistently across future sessions or on different client devices.

The server then generates an overlay entry object data structure associated with the selected coordinate location. The overlay entry object data structure defines the persistent attributes of the entry, including coordinate information, identifiers, and execution-related metadata, without storing or persisting the rendered interface element itself. Unlike predefined static fields used in traditional document systems, this data structure is generated dynamically in response to user interaction and is stored in a server-controlled database as a logical representation of the entry. A corresponding rendered entry box is instantiated by the client device based on the stored metadata, enabling user interaction while maintaining a clear separation between the immutable static electronic document, the persisted entry data structure, and the transient user interface representation.

Each committed entry is associated with a multi-tiered identification framework that enables the system to reconstruct the precise sequence of execution on the page. When an entry box is first created, the system generates a core identifier, which is a persistent, immutable identifier assigned at creation time. The core identifier may be numerical, alphanumeric, or any structured identifier format suitable for database indexing. Although the core identifier does not change throughout the lifetime of the entry box and serves as the underlying anchor for all metadata and event-record associations, it is generally not exposed to the user.

In addition to the core identifier, the system assigns one or more page-level identifiers that also may be numerical or alphanumeric. Upon initial creation, before the entry box acquires permanence, the system assigns an unapproved page-level identifier. This unapproved identifier is a sequential value that may change as new entries are created or removed, and it exists solely to support AI-assisted review and to provide user-friendly reference numbering. Entry boxes that retain only an unapproved identifier may be deleted.

Once an entry box satisfies the criteria for permanence, such as receiving a first committed user-entered value, the system assigns a temporary page-level identifier. The temporary identifier is immutable after assignment and may be numerical or alphanumeric, thereby capturing the stable ordering of entries on the page. Following workflow advancement or formal approval events, the system may assign a final approved page-level identifier that reflects the definitive execution sequence for archival or compliance review. Collectively, these identifiers allow the system to reproduce execution order reliably and to distinguish between transient, permanent, and finalized entry states in a machine-interpretable manner. This numbering system allows the system to reconstruct the order in which actions occurred, even where multiple users interacted with the same page or workflow instance concurrently. Although not illustrated, the client device receives updated state information from the server and re-renders the sequence numbers and color-coded status indicators accordingly.

In some embodiments, when a user attempts to change an existing value, the system displays a revision prompt requiring the user to provide a justification. This justification requirement aligns with regulatory constraints found in controlled manufacturing documentation environments. Once provided, the client device transmits the revision request, justification text, and new value to the server. The server generates a new immutable event record, maintains the previous value in the event ledger, and updates the overlay entry object's displayed value.

The right-hand portion of FIG. 4 displays an event-summary panel that is automatically populated using event-record information maintained by the system. In various embodiments, the event-summary panel may be generated by the server or by the client device. When generated on the client device, the client parses previously transmitted event-record data received from the server and assembles a human-readable summary without requiring additional server calls. When generated on the server, the server compiles the relevant event metadata and transmits a structured representation of the summary to the client device for display. In either configuration, the event-summary panel presents a synchronized, real-time view of the actions taken on the page. The summary panel aggregates event records associated with the page or the workflow instance. Each entry in the panel may include identifiers for the user who performed the action, a timestamp, the type of action performed, the old and new values where applicable, and any associated footnotes or tags. When a user selects an event from the summary panel, the client device retrieves additional metadata from the server and displays the full audit history, including creation events, revision events, and any deletion events associated with that overlay entry object.

In some embodiments, the system supports annotations such as footnotes applied at different granularities. A footnote may be attached to a specific entry, a page, or the entire workflow. These annotations are treated as additional event records and are stored in the immutable event ledger. Metadata tags may also be applied to entries for classification, grouping, or automated extraction. These tags facilitate downstream data processing, such as summary reporting, analytics, or integration into external systems.

In the embodiment shown in FIG. 4, user interactions executed on the client device may follow two distinct operational pathways depending on the nature of the action. For actions that are preliminary, reversible, or otherwise not yet committed by the user, such as live text entry, tentative box resizing, or cursor-based dragging, the effects may be maintained temporarily within the browser environment without immediately transmitting a corresponding event to the server. These transient states allow the user to modify or cancel the action before submission, thereby ensuring that the system does not generate unnecessary or incomplete event records.

However, once the user performs an action that is designated as official, irreversible, or otherwise requiring audit logging, such as confirming an entry value, establishing a permanent entry box position, applying a tag, or completing a revision, the client device transmits a commit instruction to the server. The server then generates and records an immutable event entry containing the committed action, and stores it in the append-only event ledger. This dual-path approach provides both efficiency and compliance, since it allows fluid, low-latency user interaction on the client side while ensuring that every committed action is fully logged, versioned, and preserved within the event ledger in a manner that prevents retroactive modification.

In the described embodiment, the client device functions primarily as a rendering and interaction terminal, responsible for presenting the static electronic document, capturing user input, and performing optional preliminary validation or redundancy checks on the data entered by the user. Although the client device may execute local checks for convenience or responsiveness, these checks are not considered authoritative since they may be bypassed through script injection, browser manipulation, or other forms of client-side interference. For this reason, the server acts as the final authority for all state transitions associated with the execution of the static electronic document.

When the client submits user-entered data or a structural modification request, the server revalidates the submitted values, verifies coordinate legality, enforces tag-based validation rules, and confirms conformance with workflow requirements. Only after server-side validation succeeds does the system commit the action and generate an immutable event record. This architecture ensures that no client-side manipulation can alter the authoritative state of the document execution session, and that trusted actions originate from server-validated operations. The server receives user actions, processes the actions, updates the database, appends immutable event records to the event ledger, resolves concurrency conflicts, and returns updated workflow state information to the client device. The client device then re-renders the overlay entry objects and event-summary panel according to the newly received state. Through this architecture, one or more execution steps occur without altering the underlying static electronic document.

Figure 5:
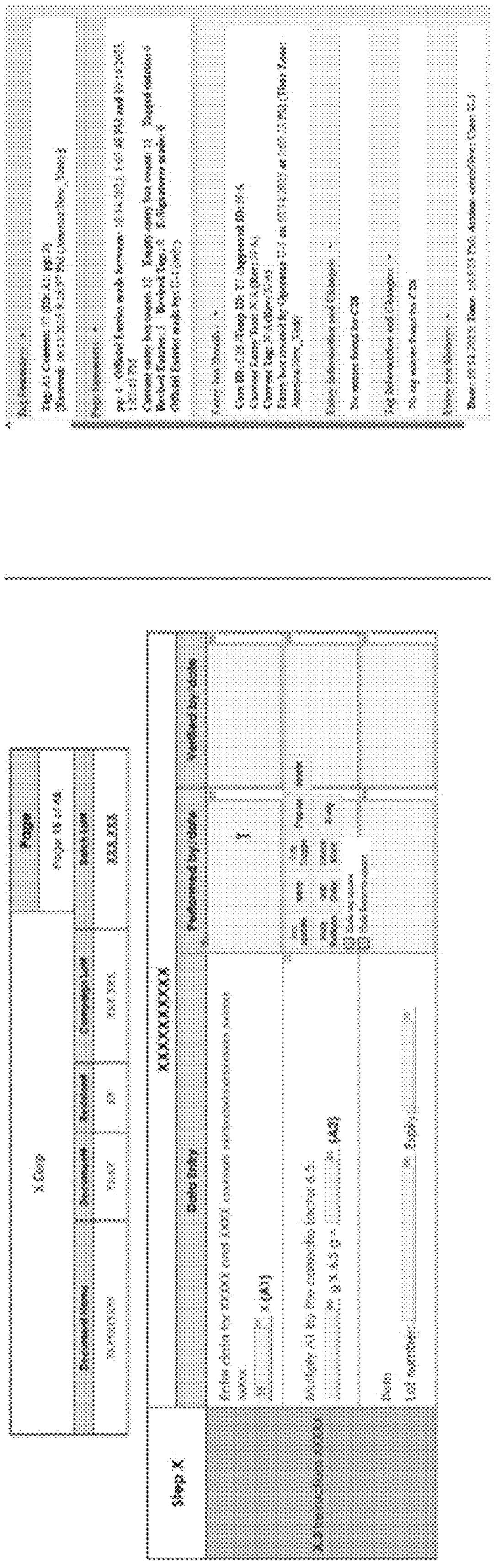
FIG. 5 illustrates an operational display of the electronic document execution system when a user interacts with a workflow instance that includes a static electronic document and one or more overlay entry objects, according to some embodiments of the present disclosure.

As shown in FIG. 5, the client device renders a static electronic document in a read only state within the viewport. The rendered document includes tabular process steps, verification sections, attestation lines, and other structured regions commonly found in controlled process documentation. These regions are not directly editable by the user. Instead, the system allows the user to create and interact with overlay entry objects that are positioned above the corresponding locations of the static electronic document.

In the embodiment illustrated, the client device displays several overlay entry objects corresponding to data entry fields generated on the fly. These entry objects reflect user-generated inputs that have been transmitted to the server and persisted in the system database. Each entry object maintains metadata including positional coordinates of both of the origin and entry box, sequence identifiers, committed values, and any associated revision history. Entry objects that have not yet been committed appear in an unexecuted visual state, while those with committed values are presented in a visually distinct state, such as the shaded fields shown in FIG. 5. This visual differentiation allows users to immediately identify which steps of the workflow have been executed and which remain pending.

The client device also displays an event-summary panel adjacent to the viewport. In FIG. 5, the panel lists chronological entries that correspond to actions performed by the user or other authorized participants. Each summary entry contains metadata describing the action, including the type of event generated, the associated overlay entry object, and the time of execution. When the user selects an item in the event-summary panel, the client device retrieves the audit information required to display the historical details of the selected entry. In various embodiments, the audit details may be fetched directly from the server through a request that identifies the corresponding event record or overlay entry object. In other embodiments, the audit details may be reconstructed locally by the client device by parsing structured event data that was previously transmitted to the browser as part of the workflow state. This allows the client device to generate the audit view without issuing a new server request, while the server remains the authoritative source of truth for all immutable event information. Regardless of the retrieval mechanism, the event-summary panel presents a synchronized and human-readable history of the selected entry, including timestamps, user identifiers, revision information, and other metadata associated with the committed actions. The server returns historical metadata such as previous values, associated comments, change justifications, and any annotations or tags applied to the underlying overlay entry object.

FIG. 5 further illustrates how the system supports structured workflow execution. The static electronic document includes predefined process steps, tables, and verification signatures. The overlay entry objects allow the user to populate these fields without modifying the static electronic document itself. When an entry is committed, the system transmits a corresponding event to the server. The event is processed, stored as an immutable event record, assigned a sequence number, and appended to the event ledger. The server then updates the client device with the new state. This enables the client interface to reflect real-time workflow progression without requiring a full re-render of the static electronic document.

The system shown in FIG. 5 also supports revision workflows. If a user selects a previously committed entry for modification, the client device displays a revision prompt. The user must provide a justification for the modification. Once the justification is entered, the updated value and justification metadata are transmitted to the server. The server generates a new immutable event record, preserving the previous value in the event ledger while updating the display to show the revised value. This mechanism ensures that one or more changes remain traceable, and no prior state is deleted or overwritten.

In some embodiments, overlay entry objects may be tagged with metadata categories or footnotes. These annotations can describe exceptions, clarifications, or contextual information relevant to the workflow. Tags and footnotes are stored in the database and the event ledger as separate events, ensuring that one or more contextual details remain associated with the correct portion of the workflow.

Throughout the operational display 500, every interaction between the client device and the server occurs through a structured exchange of event data. The client device is responsible for rendering the static document, displaying overlay entry objects, and capturing user input, while the server is responsible for maintaining global workflow state, resolving concurrency, generating sequence numbers, and storing immutable event records. FIG. 5 therefore demonstrates an execution environment in which static documents remain fully immutable, while dynamic workflow execution is performed using overlay entry objects, server-side audit structures, and real-time client rendering synchronized through continuous communication with the backend system.

In some embodiments, certain aspects of the techniques described above may be implemented by one or more processors of a processing system executing software that enables additional output transformations beyond interactive document execution. For example, after a workflow has reached a finalized or otherwise committed state, the system may utilize the normalized coordinates, entry-box metadata, and associated event records to generate a flattened portable document format file that incorporates all executed entries into a single consolidated representation. This flattening process uses the stored coordinate information and the metadata structure associated with each overlay entry object to accurately render the finalized entries into fixed positions on the output file, thereby producing a document that preserves the visual and structural relationships of the executed content without relying on dynamic overlay logic.

The ability to produce a flattened portable document format file provides several technical benefits. First, it enables high-fidelity portability of the executed workflow, allowing the file to be distributed, archived, or reviewed independently of the execution platform. Second, the flattened file format is well suited for ingestion by large language models and associated extraction frameworks, which commonly rely on portable document format files for retrieval augmented generation pipelines, document indexing, data lake ingestion, and knowledge-management workflows. Because the flattened output does not require embedded form fields or interactive layers, the resulting file is optimized for downstream text extraction and machine processing, including near term and emerging artificial intelligence systems. In this manner, the system produces a durable, final-state representation of the executed document that preserves execution integrity while enabling compatibility with widely adopted data processing ecosystems. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

In some embodiments, the computing system renders a static electronic document within a client-side rendering container configured as a zoom wrapper having fixed layout dimensions. The zoom wrapper is assigned an explicit width and height by the application, such that the layout dimensions of the wrapper remain constant regardless of device resolution, pixel density, viewport size, or browser-level zoom. By fixing the layout dimensions of the zoom wrapper, the system establishes a stable, device-independent coordinate space that serves as a normalized layout reference for both document rendering and overlay entry placement.

The system further supports a system-controlled zoom mechanism that is independent of browser zoom. When a user adjusts the system-controlled zoom level, the zoom wrapper is visually scaled using a display-level transformation applied to the wrapper. This transformation affects only the rendered appearance of the document and associated overlay elements, while the underlying layout metrics of the zoom wrapper, including width, height, offsets, and bounding box calculations, remain unchanged from the perspective of the document object model. As a result, visual scaling is achieved without altering the fixed coordinate relationships defined by the zoom wrapper.

Under non-zoomed conditions, both display operations and user interaction operations are performed directly within the normalized coordinate space established by the zoom wrapper, without requiring coordinate transformation. The normalized dimensions of the zoom wrapper may be derived from the native dimensions of the underlying document, such as a portable document format page size, and mapped into a fixed coordinate system using a predetermined scaling relationship. In one example, a physical page dimension is mapped into a normalized layout using a fixed number of layout units per physical unit, thereby allowing the same normalized coordinate system to be reused consistently across sessions and devices.

When system-controlled zoom is applied, the browser automatically scales the rendered content of the zoom wrapper, including the static electronic document and any overlay entry boxes, such that visual alignment is preserved without additional layout recalculation. However, display-level transformations do not alter layout-based measurements or interaction coordinate reporting. Layout properties, such as element dimensions and offsets, remain expressed in the original normalized coordinate space, while interaction events, such as mouse or pointer events, report positions relative to the visually scaled presentation.

To reconcile this divergence between visual scaling and interaction coordinate reporting, the system applies interaction-specific coordinate transformation during certain user actions. In particular, when a user performs manual operations such as creating a new entry box, resizing an existing entry box, or repositioning an entry box while system-controlled zoom is active, the transform engine converts interaction coordinates reported in the visually scaled space back into normalized layout coordinates. This conversion may be performed by applying an inverse transformation corresponding to the active zoom factor, thereby mapping interaction coordinates into the fixed coordinate space defined by the zoom wrapper.

The transformed coordinates are then used to define or update the normalized origin-point coordinates and normalized entry-box coordinates associated with an overlay entry object data structure. By preserving the normalized coordinate space as the authoritative reference and applying coordinate transformation only during interaction events affected by visual scaling, the system ensures that logical placement, resizing, and movement of overlay entry objects remain consistent and repeatable across zoom levels. Visual rendering continues to rely on the zoom wrapper's display-level scaling, while interaction logic operates on normalized coordinates, thereby maintaining correct logical positioning without requiring re-rendering or modification of the static electronic document. This separation of display normalization from interaction coordinate correction allows the system to support precise execution workflows, including accurate placement of entry origin points and entry boxes, while enabling flexible visual zooming for user convenience. The approach further avoids reliance on device-dependent pixel measurements, reduces cumulative coordinate drift, and facilitates that overlay entry object metadata remains stable and portable across sessions, devices, and rendering contexts.

EXAMPLES

Embodiment 1. A computer-implemented method executed by a computing system for device-independent execution of a static electronic document, the method comprising: receiving, by a server, a static electronic document in a read-only format and storing the static electronic document in a write-protected file store to prevent corruption of document content; rendering, by a client device, a visual representation of the static electronic document within a viewport of the client device; detecting, by the client device, a user selection of a region of the viewport and generating raw viewport coordinates corresponding to the region; mapping, by the client device or the server, the raw viewport coordinates into device-independent normalized coordinates comprising: normalized origin-point coordinates identifying an anchor location on the static electronic document; and normalized entry-box coordinates identifying an initial placement of an entry box, the mapping based on baseline dimensions defined by a set-sized zoom wrapper that maintains fixed CSS pixel ratios such that browser-level zoom does not affect coordinate relationships within the wrapper; applying one or more coordinate-transform adjustments when a system-controlled zoom operation is active and the user performs a resizing or positional movement of the entry box, wherein the coordinate-transform adjustments convert CSS pixel-based mouse-point coordinates extracted during the resizing or positional movement into updated normalized entry-box coordinates, while preserving the normalized origin-point coordinates, and wherein visual rendering of the static electronic document and the entry box is performed by the zoom wrapper using a display-level zoom property without requiring coordinate transformation; creating, by the server, an overlay entry object data structure associated with the normalized origin-point coordinates and the normalized entry-box coordinates, the overlay entry object data structure storing metadata describing the entry object but not the rendered object itself, and storing the overlay entry object data structure in a database separate from the static electronic document such that the static electronic document remains immutable; receiving, by the server, user-entered data for the overlay entry object data structure; generating, by the server, an immutable event record comprising the normalized origin-point coordinates, the normalized entry-box coordinates, one or more dimensions associated with the overlay entry object data structure, the user-entered data, a timestamp, a user identifier, an Internet Protocol address, and a session identifier; storing, by the server, the immutable event record in an append-only event ledger implemented using a tamper-evident structure that prevents modification of prior event records; and displaying, by the client device, an entry box rendered using metadata stored in the overlay entry object data structure, including the normalized origin-point coordinates and the normalized entry-box coordinates, and displaying a visual indicator of the immutable event record within the viewport without modifying the static electronic document.

Embodiment 2. The computer-implemented method of embodiment 1, wherein the device-independent normalized coordinates are derived by mapping native page dimensions of the static electronic document, expressed in document units, into a fixed CSS layout coordinate system having predefined pixel-per-unit ratios, the fixed CSS layout coordinate system being maintained by the set-sized zoom wrapper such that visual scaling applied to the zoom wrapper does not alter underlying layout dimensions or stored normalized coordinates.

Embodiment 3. The computer-implemented method of embodiment 1, wherein the server assigns a unique identifier to the overlay entry object data structure using a sequential numeric or alphanumeric convention, the unique identifier being stored in association with the normalized origin-point coordinates, the normalized entry-box coordinates, a document identifier, a page identifier, and a workflow identifier corresponding to a workflow instance in which the overlay entry object data structure is created.

Embodiment 4. The computer-implemented method of embodiment 1, wherein the append-only event ledger is implemented using a monotonic sequence number, a cryptographic hash chain, or both, to preserve tamper-evident ordering of the immutable event records.

Embodiment 5. The computer-implemented method of embodiment 1, wherein, after a first committed user-entered value is stored, the normalized origin-point coordinates associated with the overlay entry object data structure become immutable while the entry box remains tethered to the normalized origin-point coordinates during subsequent repositioning.

Embodiment 6. The computer-implemented method of embodiment 1, further comprising generating, by the server, a deletion event record when the overlay entry object data structure is hidden or visually removed within the client device.

Embodiment 7. The computer-implemented method of embodiment 1, further comprising displaying, by the client device, a human-readable visualization comprising an entry box rendered from the overlay entry object data structure, the normalized origin-point coordinates, the normalized entry-box coordinates, and a version history assembled from the immutable event records.

Embodiment 8. The computer-implemented method of embodiment 1, further comprising applying, by the server or the client device, an electronic signature to at least one portion of the static electronic document, including a page-level signature or a document-level signature, to transition a workflow from an execution state to a closure state.

Embodiment 9. A computing system comprising a server, a client device, a file store, and a database, the computing system configured to: receive a static electronic document in a read-only format and store the static electronic document in the file store as a write-protected document to prevent modification of document content; render, by the client device, a visual representation of the static electronic document within a viewport of the client device; detect, by the client device, a user selection of a region of the viewport and generate raw viewport coordinates corresponding to the region; map, by the client device or the server, the raw viewport coordinates into device-independent normalized coordinates comprising normalized origin-point coordinates and normalized entry-box coordinates, the mapping based on baseline dimensions defined by a set-sized zoom wrapper that maintains fixed CSS pixel ratios such that browser-level zoom does not affect coordinate relationships within the wrapper; apply, by a transform engine executed by the client device or the server, one or more coordinate-transform adjustments when a system-controlled zoom operation is active and the user performs a resizing or positional movement of an entry box, wherein the coordinate-transform adjustments convert CSS pixel-based mouse-point coordinates extracted during the resizing or positional movement into updated normalized entry-box coordinates, while preserving the normalized origin-point coordinates, and wherein visual rendering of the static electronic document and the entry box is performed by the zoom wrapper using a display-level zoom property without requiring coordinate transformation; create, by the server, an overlay entry object data structure associated with the normalized origin-point coordinates and the normalized entry-box coordinates, the overlay entry object data structure storing metadata describing the entry object but not the rendered object itself, and store the overlay entry object data structure in the database separate from the static electronic document such that the static electronic document remains immutable; receive user-entered data for the overlay entry object data structure; generate an immutable event record comprising the normalized origin-point coordinates, the normalized entry-box coordinates, one or more dimensions associated with at least one of the overlay entry object data structure, the user-entered data, a timestamp, a user identifier, an Internet Protocol address, or a session identifier; store the immutable event record in an append-only event ledger implemented using a tamper-evident structure that prevents modification of prior event records; and display, by the client device, an entry box rendered using metadata stored in the overlay entry object data structure and a visual indicator of the immutable event record within the viewport without modifying the static electronic document.

Embodiment 10. The computing system of embodiment 9, wherein the mapping of the raw viewport coordinates into the normalized origin-point coordinates and the normalized entry-box coordinates comprises relying on CSS pixel dimensions of a fixed-dimension canvas defined by the set-sized zoom wrapper, the fixed-dimension canvas preserving coordinate relationships across device types, viewport resizing, device rotation, and browser-level zoom.

Embodiment 11. The computing system of embodiment 9, wherein the transform engine is configured to apply one or more coordinate-transform adjustments when a system-controlled zoom operation is active and the user performs resizing or positional movement of the entry box, the coordinate-transform adjustments converting CSS pixel-based mouse-point coordinates extracted during the resizing or positional movement into updated normalized entry-box coordinates while preserving the normalized origin-point coordinates.

Embodiment 12. The computing system of embodiment 9, wherein the server assigns a unique identifier to the overlay entry object data structure using a sequential numeric or alphanumeric convention, the unique identifier being stored in association with the normalized origin-point coordinates, the normalized entry-box coordinates, and a page identifier.

Embodiment 13. The computing system of embodiment 9, wherein the append-only event ledger is implemented using a monotonic sequence number, a cryptographic hash chain, or both, to preserve tamper-evident ordering of the immutable event records.

Embodiment 14. The computing system of embodiment 9, wherein, after a first committed user-entered value is stored in the overlay entry object data structure, the normalized origin-point coordinates associated with the overlay entry object data structure become immutable while an entry box rendered by the client device remains tethered to the normalized origin-point coordinates during subsequent repositioning.

Embodiment 15. The computing system of embodiment 9, wherein the client device prevents a user from exiting an active entry interaction or generating a subsequent entry until the user-entered data is removed or submitted to the server, thereby preventing unsaved data from persisting within the client device during execution of the static electronic document.

Embodiment 16. The computing system of embodiment 9, wherein the server is further configured to generate a deletion event record when the overlay entry object data structure is hidden or visually removed within the viewport rendered by the client device.

Embodiment 17. The computing system of embodiment 9, wherein the client device is further configured to display a human-readable visualization comprising an entry box rendered based on the overlay entry object data structure, the normalized origin-point coordinates, the normalized entry-box coordinates, and a version history assembled from immutable event records stored in the append-only event ledger.

Embodiment 18. The computing system of embodiment 9, wherein the server or the client device is further configured to apply an electronic signature to at least one portion of the static electronic document, including a page-level signature or a document-level signature, to transition a workflow from an execution state to a closure state.

Embodiment 19. The computing system of embodiment 9, wherein each immutable event record further comprises a user-entered reason-for-change field when a modification occurs to a previously committed value stored in the overlay entry object data structure, the reason-for-change being recorded in the append-only event ledger.

Embodiment 20. The computing system of embodiment 9, wherein the server is further configured to reconstruct an entry box on the client device based on metadata stored in the overlay entry object data structure and immutable event records stored in the append-only event ledger, enabling recreation of the entry box across sessions without modifying the static electronic document.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A computer-implemented method executed by a computing system for device-independent execution of a static electronic document, the method comprising:

receiving, by a server, a static electronic document in a read-only format and storing the static electronic document in a write-protected file store to prevent corruption of document content;

rendering, by a client device, a visual representation of the static electronic document within a viewport of the client device;

detecting, by the client device, a user selection of a region of the viewport and generating raw viewport coordinates corresponding to the region;

mapping, by the client device or the server, the raw viewport coordinates into device-independent normalized coordinates comprising:

normalized origin-point coordinates identifying an anchor location on the static electronic document; and normalized entry-box coordinates identifying an initial placement of an entry box, the mapping based on baseline dimensions defined by a set-sized zoom wrapper that maintains fixed CSS pixel ratios such that browser-level zoom does not affect coordinate relationships within the wrapper;

applying one or more coordinate-transform adjustments when a system-controlled zoom operation is active and the user performs a resizing or positional movement of the entry box, wherein the coordinate-transform adjustments convert CSS pixel-based mouse-point coordinates extracted during the resizing or positional movement into updated normalized entry-box coordinates, while preserving the normalized origin-point coordinates, and wherein visual rendering of the static electronic document and the entry box is performed by the zoom wrapper using a display-level zoom property without requiring coordinate transformation;

creating, by the server, an overlay entry object data structure associated with the normalized origin-point coordinates and the normalized entry-box coordinates, the overlay entry object data structure storing metadata describing the entry object but not the rendered object itself, and storing the overlay entry object data structure in a database separate from the static electronic document such that the static electronic document remains immutable;

receiving, by the server, user-entered data for the overlay entry object data structure;

generating, by the server, an immutable event record comprising the normalized origin-point coordinates, the normalized entry-box coordinates, one or more dimensions associated with the overlay entry object data structure, the user-entered data, a timestamp, a user identifier, an Internet Protocol address, and a session identifier;

storing, by the server, the immutable event record in an append-only event ledger implemented using a tamper-evident structure that prevents modification of prior event records; and displaying, by the client device, an entry box rendered using metadata stored in the overlay entry object data structure, including the normalized origin-point coordinates and the normalized entry-box coordinates, and displaying a visual indicator of the immutable event record within the viewport without modifying the static electronic document.

2. The computer-implemented method of claim 1, wherein the device-independent normalized coordinates are derived by mapping native page dimensions of the static electronic document, expressed in document units, into a fixed CSS layout coordinate system having predefined pixel-per-unit ratios, the fixed CSS layout coordinate system being maintained by the set-sized zoom wrapper such that visual scaling applied to the zoom wrapper does not alter underlying layout dimensions or stored normalized coordinates.

3. The computer-implemented method of claim 1, wherein the server assigns a unique identifier to the overlay entry object data structure using a sequential numeric or alphanumeric convention, the unique identifier being stored in association with the normalized origin-point coordinates, the normalized entry-box coordinates, a document identifier, a page identifier, and a workflow identifier corresponding to a workflow instance in which the overlay entry object data structure is created.

4. The computer-implemented method of claim 1, wherein the append-only event ledger is implemented using a monotonic sequence number, a cryptographic hash chain, or both, to preserve tamper-evident ordering of the immutable event records.

5. The computer-implemented method of claim 1, wherein, after a first committed user-entered value is stored, the normalized origin-point coordinates associated with the overlay entry object data structure become immutable while the entry box remains tethered to the normalized origin-point coordinates during subsequent repositioning.

6. The computer-implemented method of claim 1, further comprising generating, by the server, a deletion event record when the overlay entry object data structure is hidden or visually removed within the client device.

7. The computer-implemented method of claim 1, further comprising displaying, by the client device, a human-readable visualization comprising an entry box rendered from the overlay entry object data structure, the normalized origin-point coordinates, the normalized entry-box coordinates, and a version history assembled from the immutable event records.

8. The computer-implemented method of claim 1, further comprising applying, by the server or the client device, an electronic signature to at least one portion of the static electronic document, including a page-level signature or a document-level signature, to transition a workflow from an execution state to a closure state.

9. A computing system comprising a server, a processor and memory, a client device, a file store, and a database, the computing system configured to:

receive a static electronic document in a read-only format and store the static electronic document in the file store as a write-protected document to prevent modification of document content;

render, by the client device, a visual representation of the static electronic document within a viewport of the client device;

detect, by the client device, a user selection of a region of the viewport and generate raw viewport coordinates corresponding to the region;

map, by the client device or the server, the raw viewport coordinates into device-independent normalized coordinates comprising normalized origin-point coordinates and normalized entry-box coordinates, the mapping based on baseline dimensions defined by a set-sized zoom wrapper that maintains fixed CSS pixel ratios such that browser-level zoom does not affect coordinate relationships within the wrapper;

apply, by a transform engine executed by the client device or the server, one or more coordinate-transform adjustments when a system-controlled zoom operation is active and the user performs an initial placement, resizing, or positional movement of an entry box, the coordinate-transform adjustments preserving the normalized origin-point coordinates while updating the normalized entry-box coordinates, wherein the coordinate-transform adjustments convert CSS pixel-based mouse-point coordinates extracted during the resizing or positional movement into updated normalized entry-box coordinates, while preserving the normalized origin-point coordinates, and wherein visual rendering of the static electronic document and the entry box is performed by the zoom wrapper using a display-level zoom property without requiring coordinate transformation;

create, by the server, an overlay entry object data structure associated with the normalized origin-point coordinates and the normalized entry-box coordinates, the overlay entry object data structure storing metadata describing the entry object but not the rendered object itself, and store the overlay entry object data structure in the database separate from the static electronic document such that the static electronic document remains immutable;

receive user-entered data for the overlay entry object data structure;

generate an immutable event record comprising the normalized origin-point coordinates, the normalized entry-box coordinates, one or more dimensions associated with at least one of the overlay entry object data structure, the user-entered data, a timestamp, a user identifier, an Internet Protocol address, or a session identifier;

store the immutable event record in an append-only event ledger implemented using a tamper-evident structure that prevents modification of prior event records; and display, by the client device, an entry box rendered using metadata stored in the overlay entry object data structure and a visual indicator of the immutable event record within the viewport without modifying the static electronic document.

10. The computing system of claim 9, wherein the mapping of the raw viewport coordinates into the normalized origin-point coordinates and the normalized entry-box coordinates comprises relying on CSS pixel dimensions of a fixed-dimension canvas defined by the set-sized zoom wrapper, the fixed-dimension canvas preserving coordinate relationships across device types, viewport resizing, device rotation, and browser-level zoom.

11. The computing system of claim 9, wherein the transform engine is configured to apply one or more coordinate-transform adjustments when a system-controlled zoom operation is active and the user performs resizing or positional movement of the entry box, the coordinate-transform adjustments converting CSS pixel-based mouse-point coordinates extracted during the resizing or positional movement into updated normalized entry-box coordinates while preserving the normalized origin-point coordinates.

12. The computing system of claim 9, wherein the server assigns a unique identifier to the overlay entry object data structure using a sequential numeric or alphanumeric convention, the unique identifier being stored in association with the normalized origin-point coordinates, the normalized entry-box coordinates, and a page identifier.

13. The computing system of claim 9, wherein the append-only event ledger is implemented using a monotonic sequence number, a cryptographic hash chain, or both, to preserve tamper-evident ordering of the immutable event records.

14. The computing system of claim 9, wherein, after a first committed user-entered value is stored in the overlay entry object data structure, the normalized origin-point coordinates associated with the overlay entry object data structure become immutable while an entry box rendered by the client device remains tethered to the normalized origin-point coordinates during subsequent repositioning.

15. The computing system of claim 9, wherein the client device prevents a user from exiting an active entry interaction or generating a subsequent entry until the user-entered data is removed or submitted to the server, thereby preventing unsaved data from persisting within the client device during execution of the static electronic document.

16. The computing system of claim 9, wherein the server is further configured to generate a deletion event record when the overlay entry object data structure is hidden or visually removed within the viewport rendered by the client device.

17. The computing system of claim 9, wherein the client device is further configured to display a human-readable visualization comprising an entry box rendered based on the overlay entry object data structure, the normalized origin-point coordinates, the normalized entry-box coordinates, and a version history assembled from immutable event records stored in the append-only event ledger.

18. The computing system of claim 9, wherein the server or the client device is further configured to apply an electronic signature to at least one portion of the static electronic document, including a page-level signature or a document-level signature, to transition a workflow from an execution state to a closure state.

19. The computing system of claim 9, wherein each immutable event record further comprises a user-entered reason-for-change field when a modification occurs to a previously committed value stored in the overlay entry object data structure, the reason-for-change being recorded in the append-only event ledger.

20. The computing system of claim 9, wherein the server is further configured to reconstruct an entry box on the client device based on metadata stored in the overlay entry object data structure and immutable event records stored in the append-only event ledger, enabling recreation of the entry box across sessions without modifying the static electronic document.

* * * * *